United States Patent [19]
Yamanaka et al.

[11] Patent Number: 5,953,341
[45] Date of Patent: Sep. 14, 1999

[54] CONTENTION CONTROL CIRCUIT

[75] Inventors: Naoaki Yamanaka; Eiji Oki, both of Tokyo; Tomoaki Kawamura, Iruma; Tsuneo Matsumura, Yokohama, all of Japan

[73] Assignee: Nippon Telegraph and Telephone Corporation, Tokyo, Japan

[21] Appl. No.: 08/936,667

[22] Filed: Sep. 24, 1997

[30] Foreign Application Priority Data

Sep. 25, 1996 [JP] Japan .................................. 8-253300
Oct. 24, 1996 [JP] Japan .................................. 8-282522
Oct. 24, 1996 [JP] Japan .................................. 8-282553

[51] Int. Cl.$^6$ ............................. H04L 12/28; H04L 12/56
[52] U.S. Cl. .......................... 370/416; 370/412; 370/389
[58] Field of Search ................................... 370/362, 363, 370/412, 468, 395, 416, 418

[56] References Cited

U.S. PATENT DOCUMENTS 5,150,358  9/1992  Punj et al. ............................... 370/418
5,305,310  4/1994  Itoh et al. ............................... 370/392
5,446,738  8/1995  Kim et al. ............................... 370/395
5,850,399  12/1998  Ganmukhi et al. ....................... 370/412

OTHER PUBLICATIONS

Ren, J. et al., "A Dynamic Priority Queueing Approach To Traffic Regulation And Scheduling In B–ISDN", Proceedings Of The Global Telecommunications Conference (GLOBECOM), San Francisco, Nov. 28 –Dec. 2, 1994, vol. 1, Nov. 28. 1994, pp. 612–615, XP000488618.

Primary Examiner—Jeffery A. Hofsass
Assistant Examiner—John Pezzlo
Attorney, Agent, or Firm—Pillsbury Madison & Sutro LLP

[57] ABSTRACT

A contention control circuit which temporarily stores cells arriving from a respective plurality of input lines to output cells to a single output line without collisions. The contention control circuit compares, at each input line in turn, the priority of the cell that has arrived from that input line, with the priority of the cell selected from among the cells that have arrived from preceding input lines as the cell having the highest priority, and again selects the cell with the higher priority.

15 Claims, 19 Drawing Sheets

CONTENTION CONTROL CIRCUIT

BACKGROUND OF THE INVENTION

1. Field of the Invention

The present invention is utilized for asynchronous transfer mode (ATM) communications and is suitable for use in ATM communication networks in which there are cells of different service classes. This invention was developed for application to cells in ATM communications, but it is also widely applicable to packet based communications other than ATM.

2. Description of the Related Art

In ATM communications, information is transmitted and received after being placed in fixed-length packets called cells. If there are a large number of cells for the same destination and these cells are output simultaneously to the same line, collisions will occur between cells. As a result, there will be an increase in the number of dropped cells. If the number of dropped cells increases, retransmission at the source becomes necessary, with the result that the efficiency of information transfer of the ATM network decreases.

In order to avoid such a situation, control aimed at preventing cell collisions is performed at ATM switches and other devices that control the direction of cell output. This is called contention control. Conventional contention control circuits will be explained with reference to FIGS. 21–22. FIG. 21 shows the overall configuration of a conventional contention control circuit, while FIG. 22 shows the overall configuration of a conventional contention control circuit in an ATM network includes cells of different service classes.

In FIG. 21, the conventional contention control circuit includes input lines 1-1 to 1-4, read control circuits 17-1 to 17-4, a ring arbiter 65, and queuing buffers 4-1 to 4-4. Cells A to D which have been transferred from input lines 1-1 to 1-4 are temporarily stored in queuing buffers 4-1 to 4-4. When cells arrive or are queuing, read control circuits 17-1 to 17-4 send a read request to ring arbiter 65. Ring arbiter 65 sends a read permission in response to any read control circuit 17-1 to 17-4 which has issued a read request.

Next, an explanation will be given of a conventional contention control circuit in an ATM network which includes cells of different service classes. As shown in FIG. 22, buffer units 2-1 to 2-4 respectively comprise high priority class (hereinafter termed H class) buffers 4-1 to 4-4 and low priority class (hereinafter termed L class) buffers 5-1 to 5-4. Input line 1-1 (#1) will be taken as an example and an explanation given of the operation of buffer unit 2-1.

When a cell is input to buffer unit 2-1, a control unit (not illustrated) of buffer unit 2-1 refers to the quality class identifier in the cell header and thereby recognizes whether the cell is an H class cell or an L class cell. The cell is then allocated by selector 33-1 to either H class buffer 4-1 or L class buffer 5-1.

In buffer unit 2-1, cells AH1, AH2 and AH3 are stored in H class buffer 4-1, and cell AL1 is stored in L class buffer 5-1. When an H class cell is stored, selector 6-1 preferentially selects the H class cell regardless of whether an L class cell is present. An L class cell is selected by selector 6-1 only when no H class cell is stored in H class buffer 4-1.

Buffer units 2-1 to 2-4 therefore send cell output request signals to contention control unit 90 for the following cells, respectively: H class cell AH1, L class cell BL1, L class cell CL1, and L class cell DL1.

Assuming that the send permission in ring arbiter 65 is presently at input line 1-1 (#1), cell AH1 is sent first. Next, the send permission is given to input line 1-2 (#2) and cell BL1 is sent. In the same way, cells CL1, DL1, AH2 and BL2 are subsequently sent.

The ring arbiter of a conventional contention control circuit of this sort guarantees only the equality of the number of reads of each input line 1-1 to 1-4. It does not guarantee that the order in which cells arrive is maintained.

For example, FIG. 23 is a timing chart showing an output of the conventional contention control circuit illustrated in FIG. 21. Although cell C on input line 1-3 (#3) has arrived later than the other cells A, B and D, as shown in FIG. 23, cell C (arrived at t=3) is read before cell D (arrived at t=1). Thus, the overall temporal order is not guaranteed, and only the equality of the number of reads of each input line is guaranteed. In this example, it is assumed that there were no cells queuing in buffers 4-1 to 4-4 apart from cells A, B, C and D.

In the case of a conventional contention control circuit in an ATM network including cells of different service classes (such as shown in FIG. 22), if many H class cells are stored in the buffer unit for a particular input line, L class cells from other input lines are read first in order to maintain the equality of the number of reads of each input line.

FIG. 24 is a timing chart showing the output of the conventional contention control circuit illustrated in FIG. 22. In this example, after H class cell AH1 has been output from buffer unit 2-1, L class cell BL1 is output from buffer unit 2-2, and then L class cell CL1 is output from buffer unit 2-3 and L class cell DL1 is output from buffer unit 2-4, despite H class cells AH2 and AH3 still remaining in buffer unit 2-1. Thus, H class cell AH2 is finally output after L class cell DL1 has been output from buffer unit 2-4. Consequently, the quality of the H class can deteriorate.

A further problem is that in the case of a large-scale ATM switch, because the ring arbiter has to monitor all the read control circuits, it takes a considerable time for the ring arbiter to make one round of all the circuits. Another problem is that to extend the switch, after the number of input lines has been increased, it is necessary to perform troublesome operations such as modifying the programs of the ring arbiter, which has overall control of the contention control circuit. This results in poor extendibility.

SUMMARY OF THE INVENTION

The present invention has been devised in the light of this situation discussed above. It is an object of this invention to provide a contention control circuit capable of guaranteeing that temporal order is maintained. It is a further object of this invention to provide a contention control circuit wherein distributed contention control can be performed autonomously by a plurality of contention control units. It is yet another object of this invention to provide an easily extendible contention control circuit. It is another object of this invention to provide a contention control circuit capable of performing contention control for each different quality class. It is a further object of this invention to provide a contention control circuit whereby the transmission quality of H class cells does not deteriorate due to L class cell traffic.

An important feature of the present invention is that perfect contention control can be carried out without having to ascertain, for example, the cell queuing situation for all the input lines. This is achieved by simply comparing, at each input line in turn, the priority of the cell that has arrived from that input line, with the priority of the cell selected from among cells that have arrived at preceding input lines as the cell having the highest priority, and again selecting the cell with the higher priority.

The present invention does not have a centralized ring arbiter, performs distributed contention control, and determines which cells to output by taking into consideration their temporal order, which may include their arrival time.

The present invention is a contention control circuit which has a plurality of buffer units for temporarily storing cells respectively arriving from a plurality of input lines, and a plurality of contention control means which respectively output cells that have been respectively read from these buffer units to a single output line without collisions between the cells.

The present invention is characterized by a plurality of buffer units and contention control means, wherein each buffer unit has a first buffer. Each contention control means comprises (i) means for entering, in a cell which has been input to the corresponding first buffer, information indicative of the priority with which that cell is to be output, and (ii) a contention control unit provided in correspondence with each first buffer, the contention control units being cascade connected to the output line. Each contention control unit comprises: a second buffer for temporarily storing cells which have been output from the immediately upstream contention control unit for eventual output to the output lines. Each contention control unit further comprises means for comparing the information indicative of priority that has been respectively entered in the head cell of the cells stored in the first buffer and in the head cell of the cells stored in the second buffer, and selection means which, in accordance with the comparison result of the comparing means, selects the cell with the higher priority and outputs it to the immediately downstream contention control unit or to the output line.

The information indicative of priority can be information relating to the time at which a cell was input to the first buffer, or it can be information relating to how long the cell has queued since it was input to the first buffer.

The means for entering information in a cell can be provided separately for each first buffer, or it can be provided in common for a plurality of first buffers.

Each contention control unit can have means for counting the number of cells consecutively output from the first buffer and from the second buffer, the counts obtained by these counting means being respectively subtracted from the aforementioned queuing time information that has been entered in the head cell of the first buffer and of the second buffer. The results of these subtractions form new queuing time information, and this new queuing time information can be used as the information indicative of priority.

Supposing that cells have concentrated in a specific buffer, then when the tail cell of these cells has in due course appeared at the head position of the buffer, the queuing time information entered in that cell will have a large value. On the other hand, in the case of a buffer at which cells arrive sporadically, the queuing time information entered in a cell at the head position of that buffer will have a small value.

If the head cell of a buffer in which there is a concentration of cells actually arrived at the same time as the head cell of a buffer at which cells arrive sporadically, then because queuing time information is determined in accordance with the number of cells that were present ahead of these cells, and because the head cell of the buffer in which cells have concentrated has a larger queuing time information value than the head cell of the buffer at which cells arrive sporadically, the former cell are output preferentially. This preferential output results despite the two cells having arrived at the same time.

For example, suppose that the queuing time information entered in the head cell of a buffer where cells concentrate is 10 and that the queuing time information entered in the head cell of a buffer at which cells arrive sporadically is 1, then despite these two cells having arrived at the same time, the cell in which the queuing time information 10 is output preferentially. The head cell of the buffer at which cells arrive sporadically is not output until the queuing time information of a subsequent cell in the buffer where cells concentrate has decreased to 1.

In order to eliminate this result, new queuing time information is generated by counting the number of cells consecutively output from the first and second buffers and subtracting the result of this count from the queuing time information currently entered in the cells. Cell contention control is then performed in accordance with this new queuing time information.

In the above example, because the queuing time information of the head cell of the buffer in which cells concentrate is 10 and the number of cells which have been consecutively output from that buffer is 9, the following subtraction is performed:

$$10-9=1.$$

Because the queuing time information of the head cell of the buffer at which cells arrive sporadically is 1 and the number of cells which have been consecutively output from this buffer is 0, the following subtraction is performed:

$$1-0=1.$$

Contention control is then carried out using these new values for the queuing time information. In this case, because both of the new values are 1, the priority of the two cells is judged to be the same.

The selection means of a contention control unit according to this invention can comprise means which, when the comparison result of the comparing means indicates that the two cells have the same priority, reads a cell from the first buffer or the second buffer in accordance with respective predefined read probabilities.

Preferably, the k-th selection means counting from the upstream end of buffers and contention control units (where k is a natural number) uses a read probability of $1/k$ for the first buffer and a read probability of $(k-1)/k$ for the second buffer.

Another distinguishing feature of the present invention is that when it is to be applied to an ATM network which includes cells of different service classes, the contention control units are arranged in distributed fashion, and at each contention control unit H class cells and L class cells are distinguished and contention control is performed preferentially on H class cells. In each contention control unit there is provided a buffer for H class cells and a buffer for L class cells, and H class cells never compete with L class cells, so that quality does not deteriorate due to L class cell traffic.

Specifically, a contention control circuit according to this invention can deal with cells of different service classes by providing each buffer unit with a first high priority buffer in which high quality of service class cells are stored, a first low priority buffer in which low quality of service class cells are stored, and a first selection means which preferentially outputs cells stored in the first high priority buffer.

In this case, the features of the present invention include each contention control means comprising a contention control unit provided in correspondence with a corresponding buffer unit. The contention control units are cascade connected to the output line. Each contention control unit includes, for cells which have been output from the immediately upstream contention control unit for eventual output to the output line, a second high priority buffer in which are stored high quality of service class cells, and a second low priority buffer in which are stored low quality of service class cells, and a second selection means which preferentially outputs cells stored in the second high priority buffer. Each contention control unit further comprises read and selection means which, when one of the first selection means and the second selection means outputs a high service class cell, reads that high service class cell, and when the first selection means and the second selection means are both about to output cells of equal service class, reads a cell after performing contention control, and outputs it to the output line.

It is preferable to provide means for entering, in cells which have been input to a first and a second high priority buffer, information relating to how long the cell queues from input until output. It is also preferable for the read and selection means to read the cell which has the larger value for this queuing time information.

An alternative configuration is for the first low priority buffer and the second low priority buffer to have been configured as a single buffer. Namely, this invention can also be configured with only a buffer for H class cells being provided in the contention control unit, and so that L class cells transferred from an immediately upstream contention control unit are transferred to the L class buffer of the buffer unit. This enables the overall buffer size in the contention control unit to be reduced. It also facilitates the simplification of the cell read and select algorithm that is executed when a cell output request is output from the buffer unit and the contention control unit.

It is preferable for the read and selection means to comprise means which, when cells from the first and second selection means have equal priority, reads these cells in accordance with respective predefined read probabilities. In this case, appropriate contention control can be maintained if the k-th read and selection means counting from upstream (where k is a natural number) uses a read probability of 1/k for the first selection means and a read probability of (k−1)/k for the second selection means.

DETAILED DESCRIPTION OF THE PREFERRED EMBODIMENT

A first embodiment of the present invention will be explained with reference to FIG. 1, which shows the overall configuration of the first embodiment.

According to the first embodiment, the present invention is a contention control circuit comprising buffer units 2-1 to 2-4 for temporarily storing cells that arrive from respective input lines 1-1 to 1-4, and contention control units 3-1 to 3-4 which respectively output cells respectively read from these buffer units 2-1 to 2-4 to a single output line OUT without collisions between cells.

The features of the first embodiment of the invention are as follows. Namely, buffer units 2-1 to 2-4 comprise queuing buffers 40-1 to 40-4. Contention control units 3-1 to 3-4 comprise timers 50-1 to 50-4 as a means for entering information indicative of the output priority in cells which have been input to queuing buffers 40-1 to 40-4. The control units 3-1 to 3-4 further comprise queuing buffers 70-1 to 70-4 provided in correspondence with respective buffer units 2-1 to 2-4 for temporarily storing cells output from immediately upstream queuing buffers for eventual output to output line OUT. The control units 3-1 to 3-4 also include selectors 80-1 to 80-4 for switching and selecting between the output of the queuing buffers 70-1 to 70-4 and queuing buffers 40-1 to 40-4, and timer value comparison circuits 60-1 to 60-4 for respectively comparing the information indicative of priority that has been entered in the head cells of queuing buffers 40-1 to 40-4 and 70-1 to 70-4, the output of these buffers being input together to selectors 80-1 to 80-4. A further feature is that selectors 80-1 to 80-4 select cells that have greater priority, in accordance with the comparison results of the timer value comparison circuits 60-1 to 60-4. In the first embodiment of the present invention, the information indicative of priority is information relating to the time at which a cell was input to queuing buffers 40-1 to 40-4.

Figure 2:
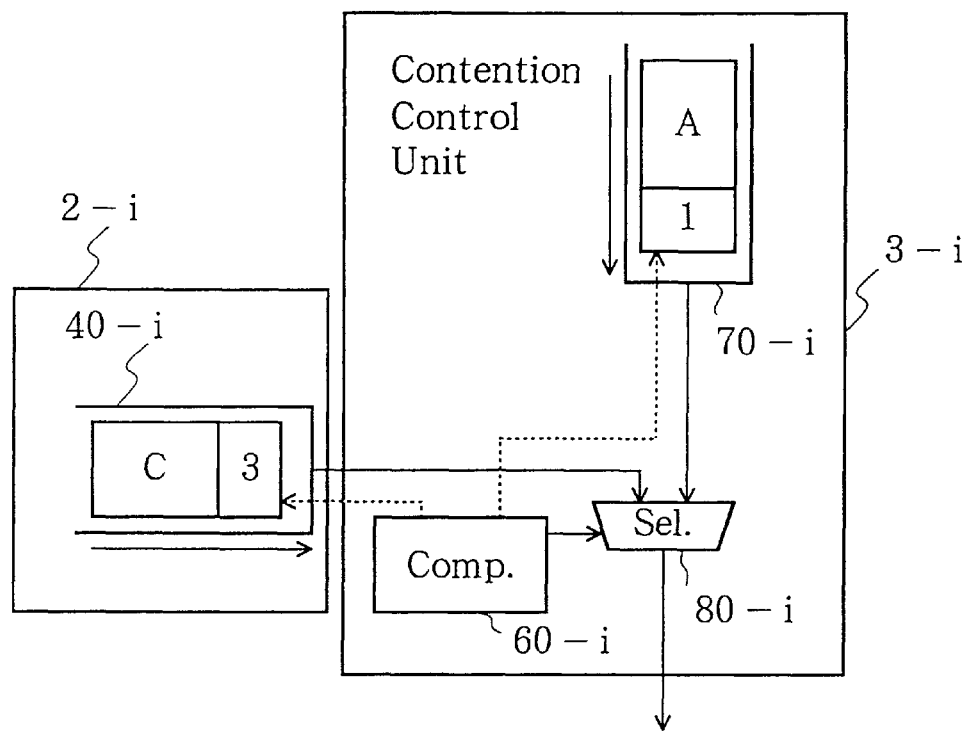
FIG. 2 is a block diagram of a buffer unit and a contention control unit according to the first embodiment.
Figure 3:
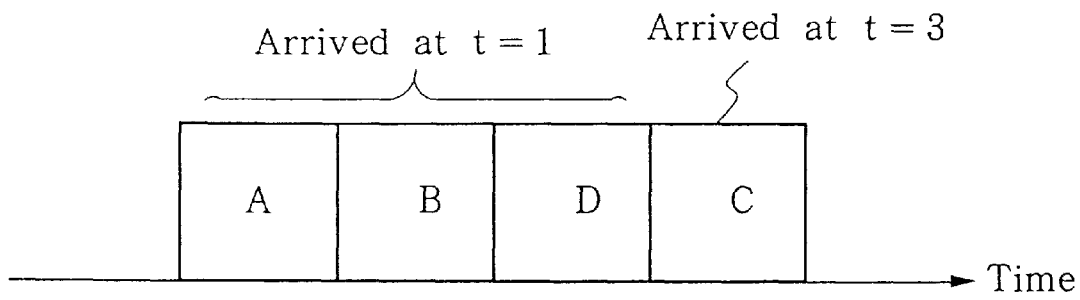
FIG. 3 is a timing chart showing an output in the first embodiment.

The operation of the first embodiment will be explained with reference to FIGS. 1–3. FIG. 2 is a block diagram of buffer unit 2-i and contention control unit 3-i of the first embodiment (where i can have any value from 1 to 4 inclusively). FIG. 3 is a timing chart showing an output in this first embodiment. FIG. 1 shows contention control units, 3-1 to 3-4 are timer value comparison circuits 60-1 to 60-4, are queuing buffers for cascade connection 70-1 to 70-4, are 2:1 selectors 80-1 to 80-4, and are timers for stamping arrival times 50-1 to 50-4.

Figure 1:
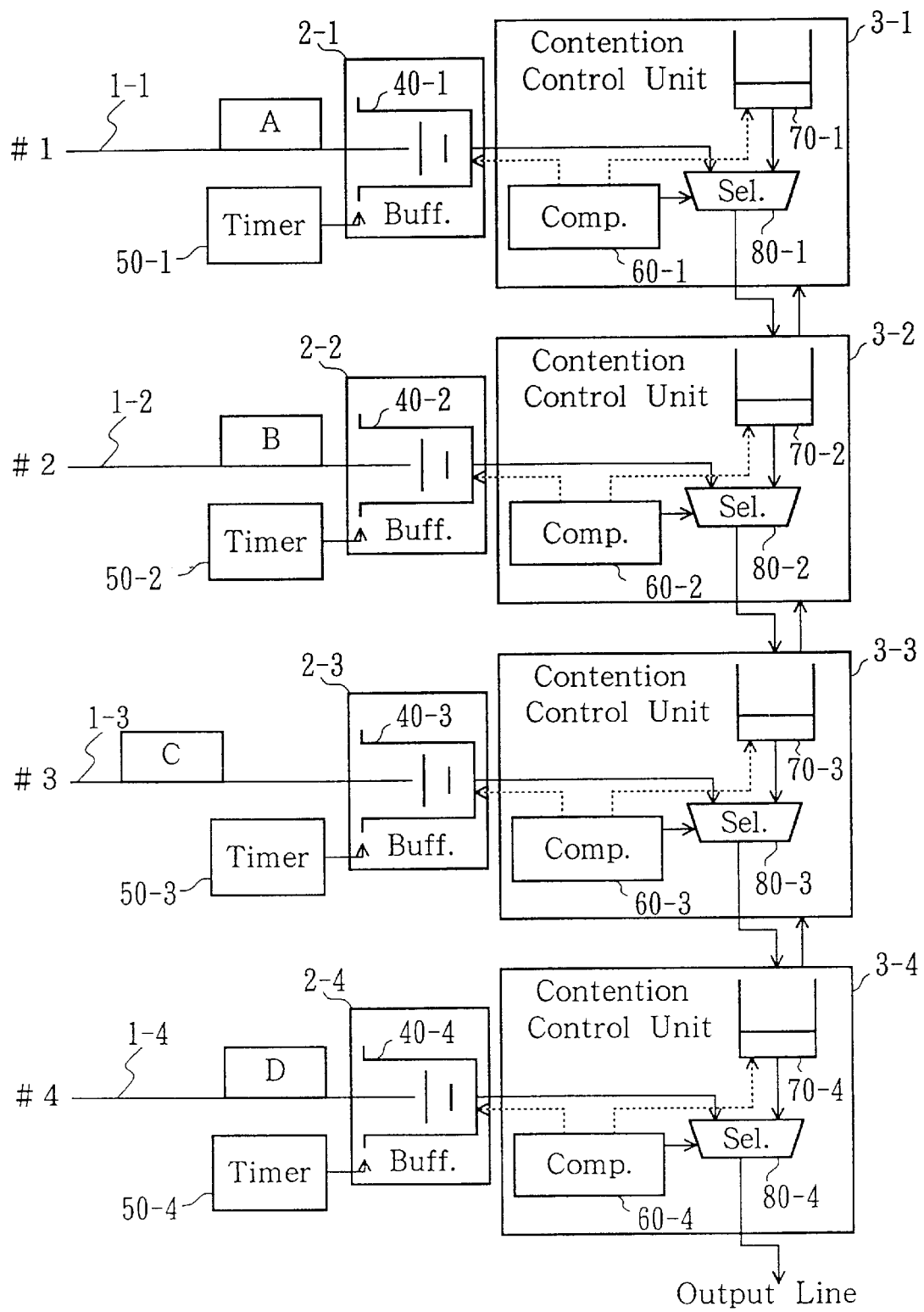
FIG. 1 shows the overall configuration of a first embodiment of the invention.

In FIG. 1, when cells A, B, C and D arrive, their arrival times are written in them by synchronized timers 50-1 to 50-4 respectively, and they are stored in queuing buffers 40-1 to 40-4.

The timer values stamped in the headers of cells stored in queuing buffers 40-1 to 40-4 and 70-1 to 70-4 are respectively compared by timer value comparison circuits 60-1 to 60-4 in contention control units 3-1 to 3-4. In the example of FIG. 2, because the timer value of cell A is 1 and the timer value of cell C is 3, cell A has priority. Of course, instead of timers 50-1 to 50-4 (which can keep time indefinitely), it would also be possible to use counters which were capable of counting over a sufficiently long period of time.

If no cell is stored in a given queuing buffer 70-1 to 70-4 or 40-1 to 40-4, then the head cell which is stored in the corresponding other buffer is output preferentially without any comparison being made. Also, if queuing buffers 70-1 to 70-4 have not received read permission, the reading of a higher stage buffer is stopped by back pressure (BP). As a result, as shown in FIG. 3, for all input lines 1-1 to 1-4, cells are output to output line OUT in the order of their arrival times.

Figure 4:
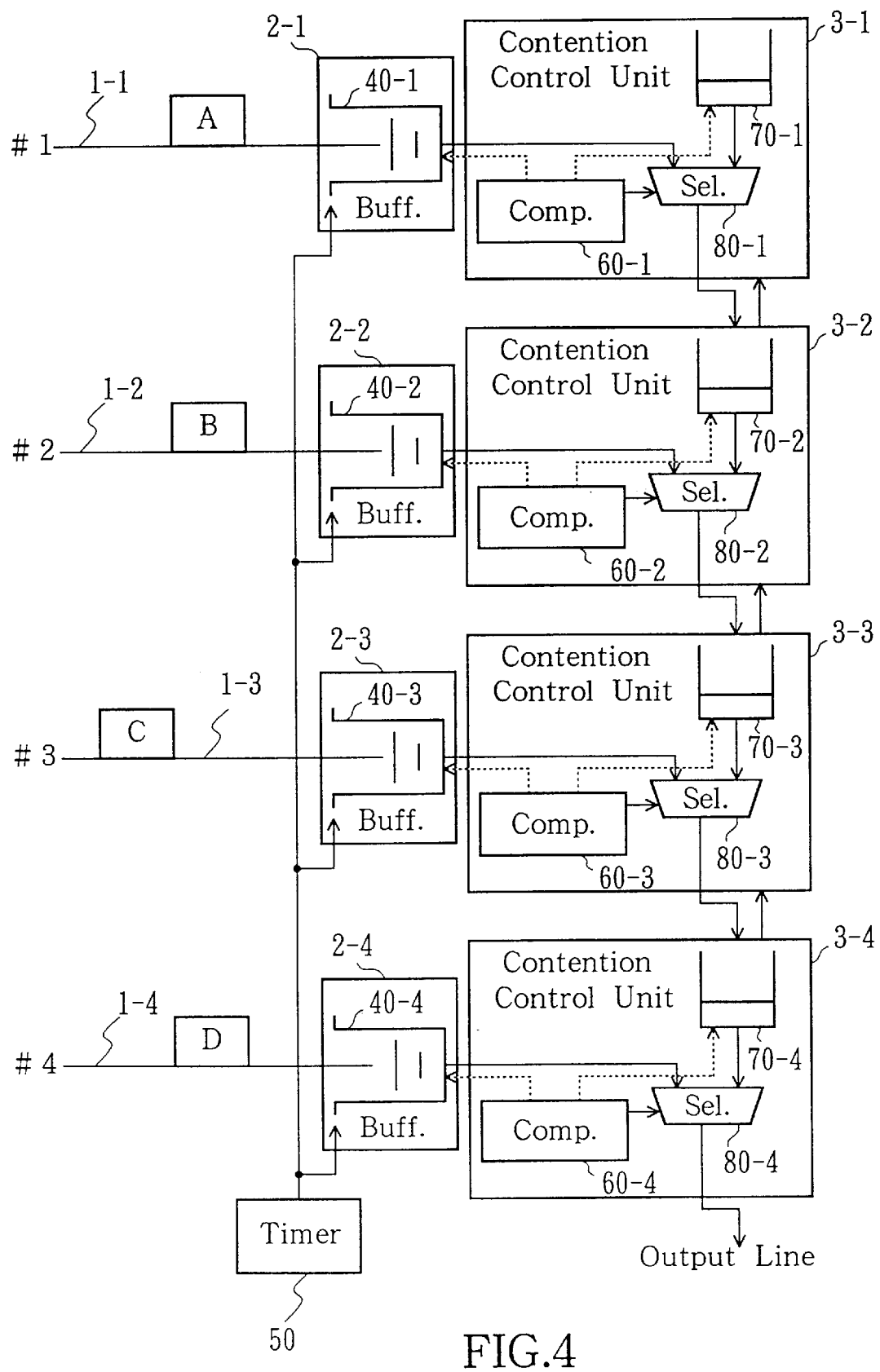
FIG. 4 shows the overall configuration of a second embodiment of the present invention.

A second embodiment of the present invention will be explained with reference to FIG. 4, which shows the overall configuration of the second embodiment. In this second embodiment, the operation of timers 50-1 to 50-4 of the first embodiment is implemented by providing a single timer 50 which is common to all buffer units 2-1 to 2-4. Thus, by reducing the number of timers, synchronization becomes easily implemented.

Figure 5:
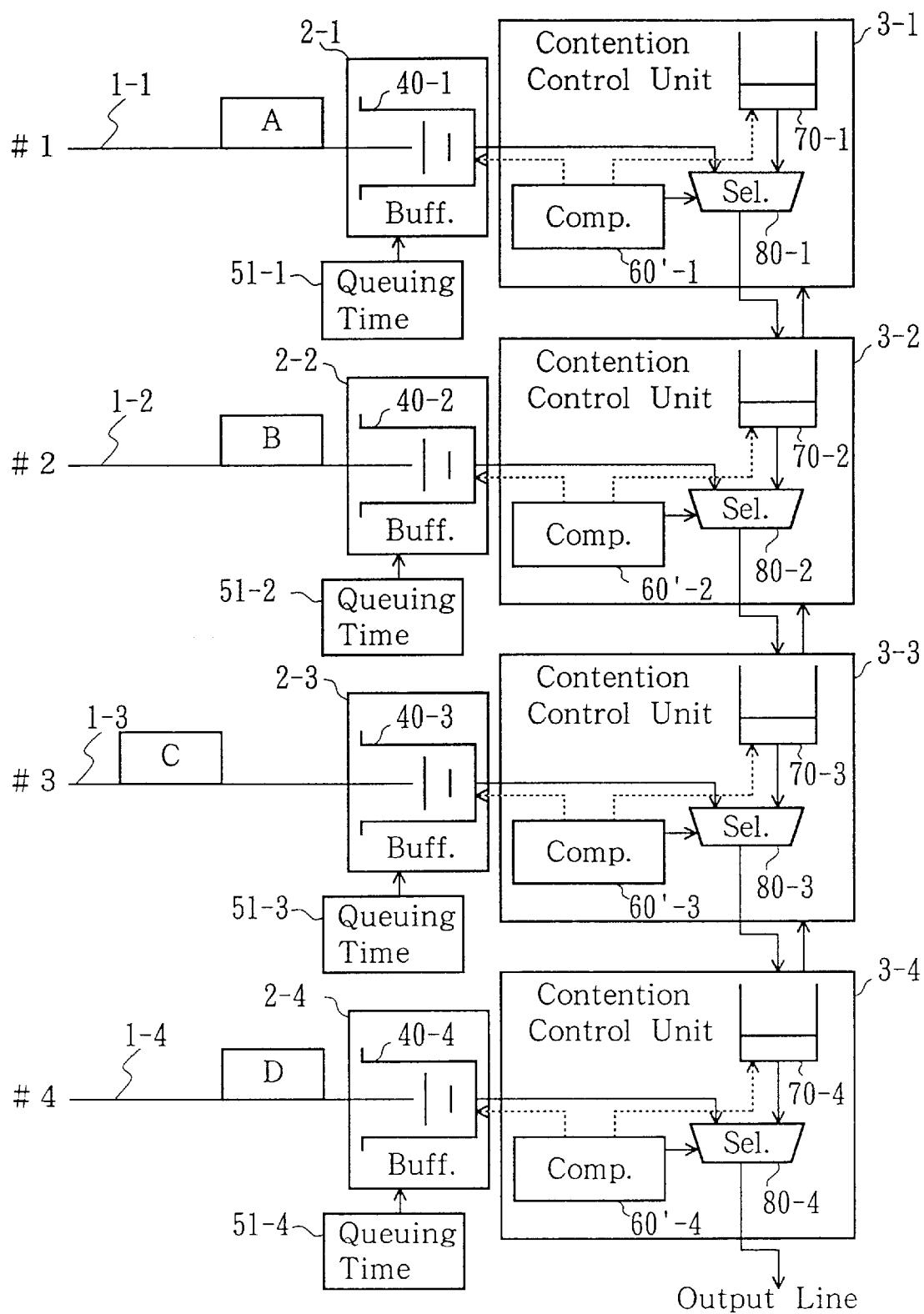
FIG. 5 shows the overall configuration of a third embodiment of the present invention.
Figure 6:
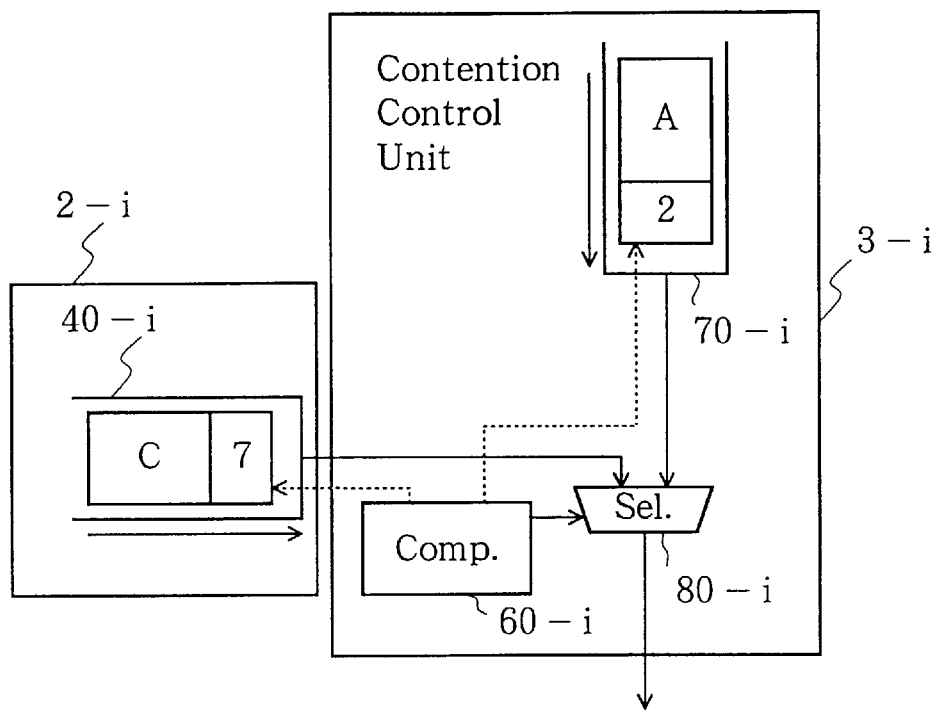
FIG. 6 is a block diagram of a buffer unit and a contention control unit according to the third embodiment.

A third embodiment of the present invention will be explained with reference to FIG. 5-6. FIG. 5 shows the overall configuration of the third embodiment, while FIG. 6 is a block diagram of a buffer unit and a contention control unit according to the third embodiment. The third embodiment includes queuing time writing circuits 51-1 to 51-4 for queuing buffers 40-1 to 40-4. The circuits 51-1 to 51-4 write a "0" in each cell when it arrives. Thereafter, each time a new cell is input to a given buffer the queuing time writing circuit for that buffer is triggered to increment the value written in each cell already in the buffer by 1. As a result, when a cell is read from the queuing buffer, it has information relating to the length of time it has queued written in its header.

Contention control unit 3-i shown in FIG. 6 outputs the cell that arrived first. The contention control unit 3-i accomplishes this by comparing, in queuing time comparison circuit 60-i, the value of the queuing time of the cell that has arrived upstream from buffer 70-i, with the value of the queuing time of the cell that has been output from queuing buffer 40-i. In this embodiment, synchronized timers that show the absolute time are not necessary. In the example of FIG. 6, because the queuing time of cell A is 2 and the queuing time of cell C is 7, cell C is preferentially output.

Figure 7:
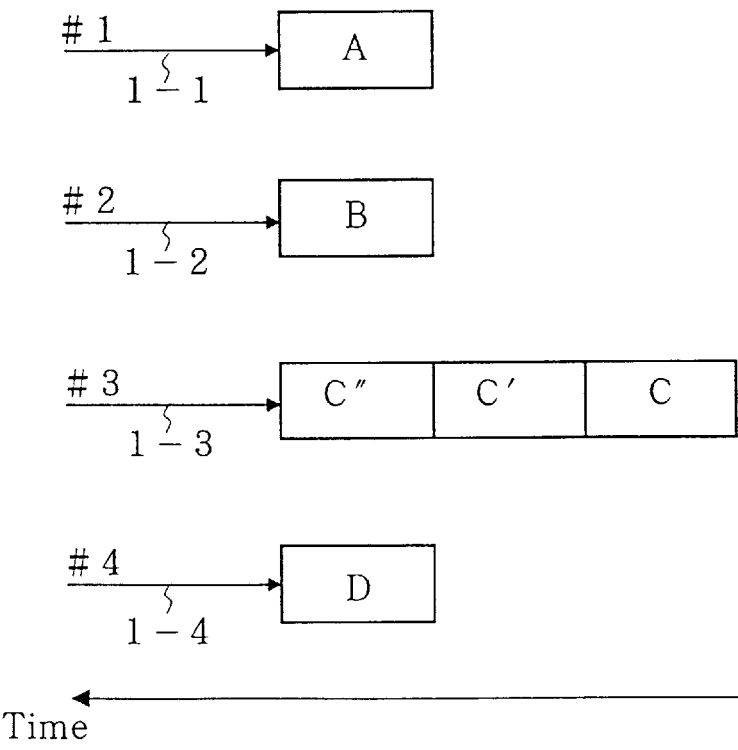
FIG. 7 shows a cell arrival situation according to the fourth embodiment of the invention.
Figure 8:
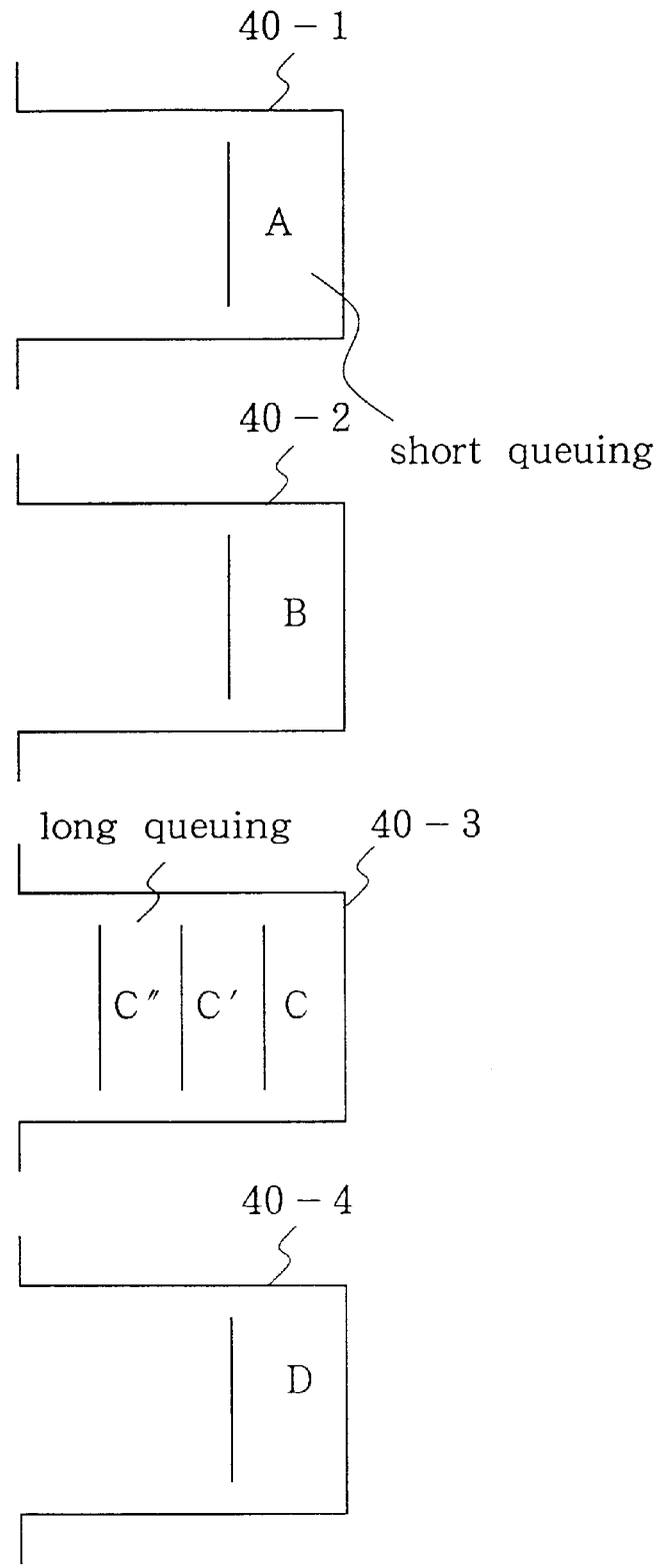
FIG. 8 shows a cell storage situation according to the fourth embodiment of the invention.
Figure 9:
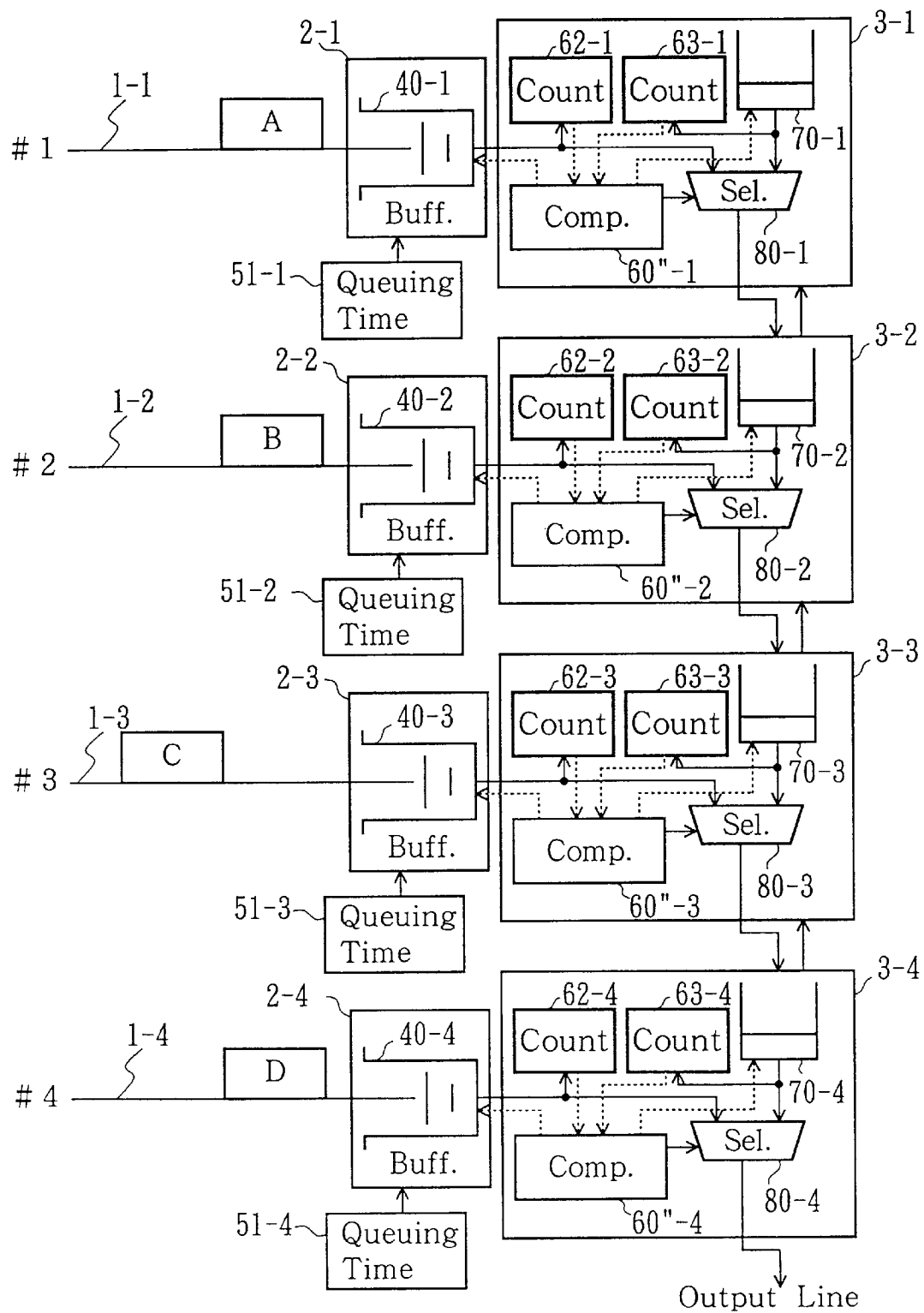
FIG. 9 shows the overall configuration of the fourth embodiment of the invention.
Figure 10:
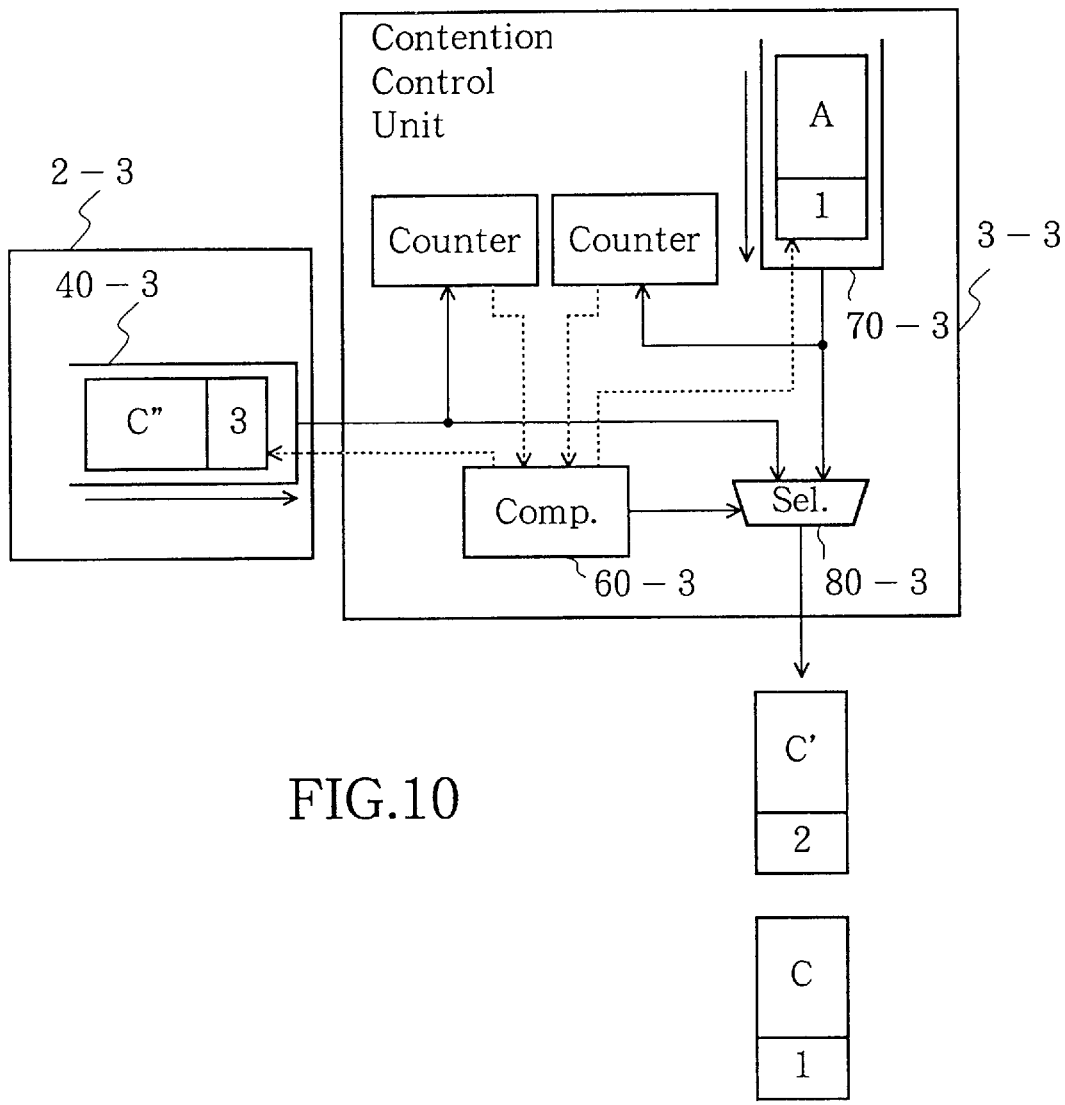
FIG. 10 shows a buffer unit and a contention control unit according to the fourth embodiment of the present invention.
Figure 11:
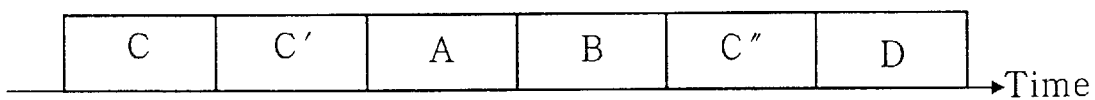
FIG. 11 shows a result of contention control according to the fourth embodiment.

A fourth embodiment of the present invention will be explained with reference to FIGS. 7–11. FIG. 7 shows a cell arrival situation for the purpose of explaining the fourth embodiment. FIG. 8 shows a cell storage situation for the same purpose. FIG. 9 shows the overall configuration of the fourth embodiment. FIG. 10 shows a buffer unit and a contention control unit according to the fourth embodiment. FIG. 11 shows a result of contention control according to this fourth embodiment.

For purposes of explanation of this fourth embodiment, it is assumed that cells concentrate in a specific input line of input lines 1-1 to 1-4. In the example of FIG. 7, cells have concentrated in input line 1-3 (#3).

When a concentration of cells arrives on a specific input line 1-3 as shown in FIG. 7, then, as shown in FIG. 8, three cells C, C' and C" will be stored in queuing buffer 40-3, while single cells A, B and D are stored respectively in each of the other queuing buffers 40-1, 40-2 and 40-4.

According to FIG. 7, cells A, B, C" and D arrive at the same time. Queuing buffers 40-1 to 40-4 would therefore conventionally operate so as to try to output cells A, B, C and D at the same time. However, when cell C" has reached the head position of queuing buffer 40-3, its queuing time information appears as 3, whereas the cells in the head position of the other queuing buffers 40-1, 40-2 and 40-4 have 1 entered as their queuing time information.

If it is assumed that the rule for cells which have arrived at the same time is that they are output in the order of their input line numbers #1 to #4, then the output order for these cells would properly be:

cell A cell B cell C" cell D.

However, because the queuing time information of cell C" is 3, then according to the previous embodiment of this invention (the third embodiment) the output order of these cells ends up being:

cell C" cell A cell B cell D

Accordingly, in this fourth embodiment of the present invention, as shown in FIG. 9, there are provided consecutive output counters 62-1 to 62-4 and 63-1 to 63-4 respectively for queuing buffers 40-1 to 40-4 and 70-1 to 70-4.

As shown in FIG. 10, for the queuing time information of cell C", the head cell of queuing buffer 40-3, is 3, and for the queuing time information of cell A, the head cell of queuing buffer 70-3, is 1. The third embodiment of the invention would compare these values of queuing time information and preferentially output the cell with the larger value, with the result that cell C" would get priority. On the other hand, the fourth embodiment has consecutive output counters 62-3 and 63-3, and in the situation depicted in FIG. 10, their count is 2 and 0, respectively. The count of consecutive output counters 62-3 and 63-3 is respectively subtracted from the value of the queuing time information of head cells C" and A. In other words, in the case of queuing buffer 40-3:

3−2=1.

and in the case of queuing buffer 70-3:

1−0=1.

Queuing time comparison circuit 60-3 compares the results of these respective subtractions. In the case illustrated here, because both are 1, it decides that the priority of the two cells is the same. Because it has been assumed that the rule is to output cells in the order of their input line number #1 to #4 when their priority is the same, cell A is output in preference to cell C". By performing contention control of this sort, the cell stream shown in FIG. 11 can be output. Thus, the temporal order of the cells is maintained.

When queuing buffer 40-3 has output cells C and C' consecutively, the count value of consecutive output counter 62-3 has reached 2. However, when the buffer outputs cell C" at the tail of the three consecutively arrived cells C, C' and C", the count value of consecutive output counter 62-3 is reset.

Consecutive output counters 62-1 to 62-4 and 63-1 to 63-4 are reset when read requests from queuing buffers 40-1 to 40-4 and 70-1 to 70-4 have ceased for at least one cell interval. In the example of FIG. 1, although the contention control makes cell C" come after cells A and B, the read request for cell C" continues to be output from queuing buffer 40-3 during the cell intervals in which cells A and B are output, and consecutive output counter 62-3 continues to receive this read request, and therefore, maintains its count value.

Figure 12:
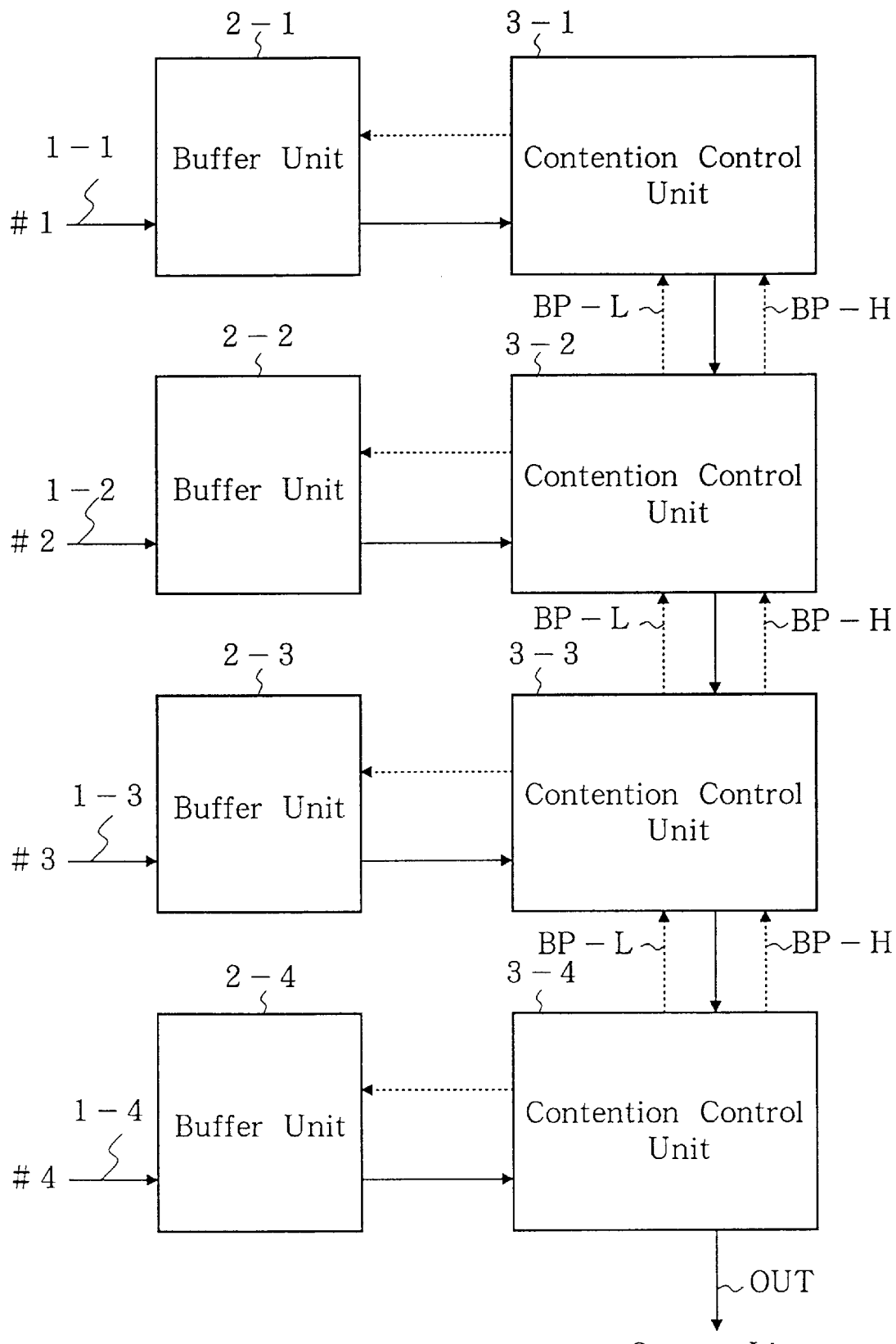
FIG. 12 shows the overall configuration of a fifth embodiment of the present invention.
Figure 13:
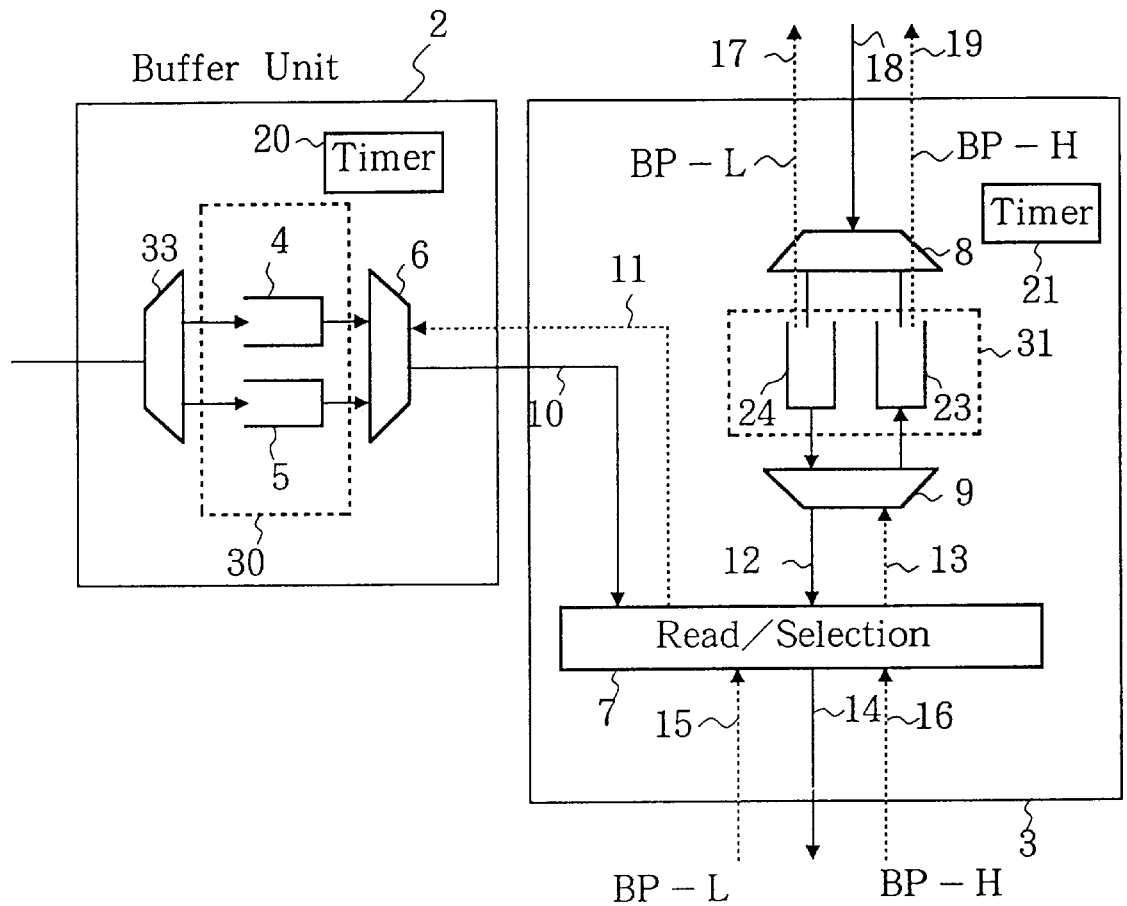
FIG. 13 is a block diagram of a buffer unit and a contention control unit according to the fifth embodiment.

The configuration of a fifth embodiment of this invention will be explained with reference to FIG. 12 and FIG. 13. FIG. 12 shows the overall configuration of the fifth embodiment, while FIG. 13 is a block diagram of a buffer unit and contention control unit according to this embodiment.

The invention according to the fifth embodiment is a contention control circuit comprising buffer units 2-1 to 2-4 for temporarily storing cells arriving from respective input lines 1-1 to 1-4, and contention control units 3-1 to 3-4 which respectively output cells respectively read from the buffer units 2-1 to 2-4 to a single output line OUT without collisions between the cells. Each buffer unit 2-1 to 2-4 comprises H class buffer 4 as a first H class buffer in which high quality of service class cells are stored, L class buffer 5 as a first L class buffer in which low quality of service class cells are stored, and selector 6 as a first selection means which preferentially outputs cells stored in H class buffer 4.

The features of the fifth embodiment of the invention are as follows. As shown in FIG. 13, each contention control unit 3-1 to 3-4 is provided in correspondence with a respective buffer unit 2-1 to 2-4, and comprises, for cells output from the immediately upstream contention control unit for eventual output to an output line OUT, H class buffer 23 as a second H class buffer in which high quality of service class cells are stored, L class buffer 24 as a second L class buffer in which low quality of service class cells are stored, and selector 9 as a second selection means which preferentially outputs cells stored in H class buffer 23. Each control unit 3-1 to 3-4 also comprises read and selection circuit 7 as the means which, when one of selector 6 and selector 9 outputs an H class cell, reads that H class cell, and when selectors 6 and 9 are both about to output cells of equal service class, reads a cells after performing contention control.

The fifth embodiment of the invention also comprises timers 20 and 21 as means for entering, in cells which have been input to H class buffers 4 and 23, information relating to how long the cell queues are held from input until output. Read and selection circuit 7 reads the cell which has the larger value for this queuing time information. In this fifth embodiment of the invention, because contention control units 3-1 to 3-4 are arranged in distributed manner and perform autonomous and distributed contention control, extendibility is improved.

The operation of this fifth embodiment of the invention will now be explained. Each buffer unit 2-1 to 2-4 comprises H class buffer 4 and L class buffer 5. As shown in FIG. 13, when a cell is input to a buffer unit 2, a control unit (not illustrated) of buffer unit 2 refers to the quality class identifier in the cell header and recognizes whether the cell is an H class cell or an L class cell.

Once the class of the cell is identified, the cell is allocated by selector 33 to either H class buffer 4 or L class buffer 5. When an H class cell is stored in H class buffer 4, selector 6 preferentially selects H class buffer 4 regardless of whether there is an L class cell in L class buffer 5. L class buffer 5 is selected by selector 6 only when no H class cell is stored in H class buffer 4.

Figure 14:
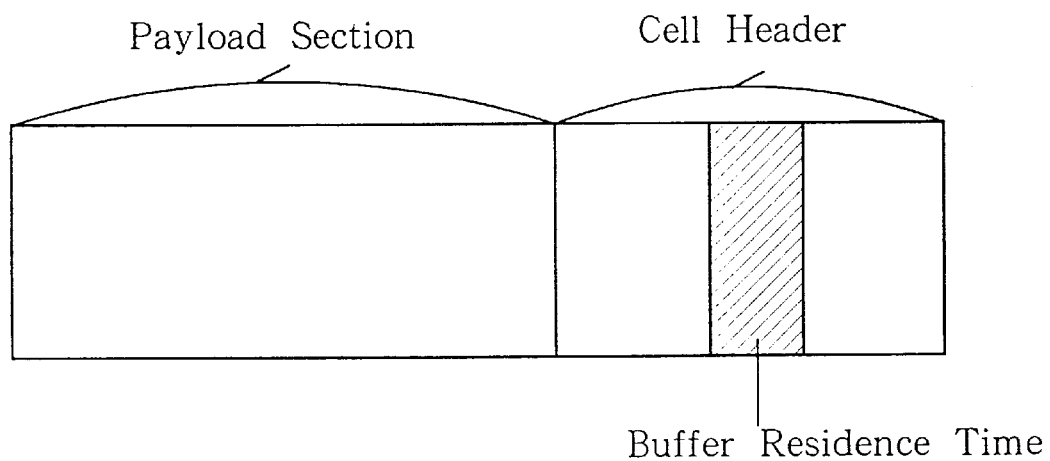
FIG. 14 shows cell format in the fifth embodiment.

The length of time an H class cell has been resident (i.e. held) in the buffer is written in part of the cell header, based on when the cell was input to H class buffer 4 from the input line. FIG. 14 shows the format of a cell according to this fifth embodiment of the invention. The residence time can increment each time one cell interval elapses, or it can increment each time a predefined number of cell intervals elapse. Writing the residence time is performed by timer 20.

In contention control unit 3, cells arrive from the immediately preceding contention control unit via line 18. However, in the case of the top contention control unit (contention control unit 3-1 in the example of FIG. 12), because there is no preceding contention control unit, no cells arrive from a previous contention control unit.

H class buffer 23 and L class buffer 24 are provided in contention control unit 3. When a cell is input to contention control unit 3 via line 18, a control unit (not illustrated) of contention control unit 3 refers to the quality class identifier in the cell header and recognizes whether the cell is an H class cell or an L class cell.

Once the class of the cell is identified, the cell is allocated by selector 8 to either H class buffer 23 or L class buffer 24. When an H class cell is stored in H class buffer 23, selector 9 preferentially selects H class buffer 23 regardless of whether there is an L class cell in L class buffer 24. L class buffer 24 is selected by selector 9 only when no H class cell is stored in H class buffer 23. Line 19 is a control signal line for sending a back-pressure signal BP-H when H class buffer 23 is full (i.e., when it has no vacant regions for storing cells). Line 17 is a control signal line for sending a back-pressure signal BP-L when L class buffer 24 is full. However, in the case of the lowest contention control unit (contention control unit 3-4 in the example of FIG. 12), because there is no lower contention control unit, no BP signal is sent from any lower contention control unit.

The residence time is written in a cell that has been input to H class buffer 23 in contention control unit 3 in the same manner as in the case of a cell input to buffer unit 2. Namely, timer 21 of contention control unit 3 increments the is residence time by the number of cell periods that the cell has been resident in H class buffer 23. However, in this case, timer 21 takes the existing residence time of the H class cell as the initial residence time when it arrives from the immediately preceding contention control unit.

Figure 15:
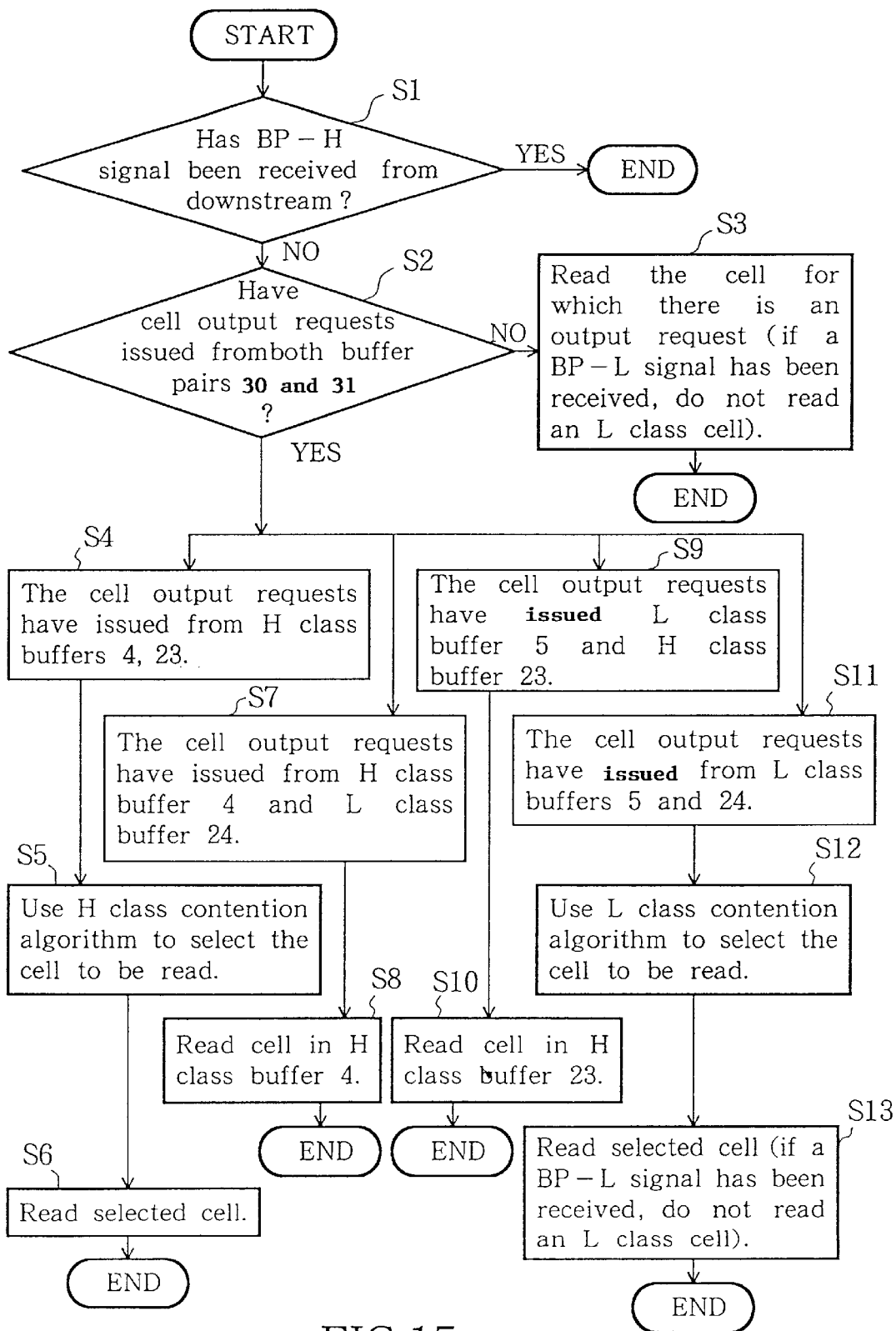
FIG. 15 is a flowchart showing the operation of a read and selection circuit according to the fifth embodiment of the invention.

Next, read and selection circuit 7 will be explained with reference to FIG. 15, which is a flowchart of the operation of read and selection circuit 7 according to the fifth embodiment of the invention. Cells are read at a given interval, and therefore, the circuit operation shown in FIG. 15 takes place at this given interval, with the same operation being repeated in the next read interval. First, the operation of read and select circuit 7 terminates if a BP-H signal is received from the immediately downstream contention control unit (S1). If a BP-H signal is not received from the downstream contention control unit, it is decided whether a cell output request has been issued from both buffer pair 30 of buffer unit 2 and buffer pair 31 of contention control unit 3 (S2). If there is a cell output request from only one of these buffer pairs, the cell for which there is an output request is read (S3). However, if a BP-L signal has been received, no L class cell will be read.

When a cell output request is issued from both buffer pair 30 and buffer pair 31 (S2), the following four operations can occur:
1. If H class buffers 4 and 23 have issued a cell output request (S4), the cell to be read is selected using an H class contention algorithm (S5), and the selected cell is read (S6).
2. If H class buffer 4 and L class buffer 24 have issued a cell output request (S7), the cell in H class buffer 4 is read (S8).
3. If L class buffer 5 and H class buffer 23 have issued a cell output request (S9), the cell in H class buffer 23 is read (S10).
4. If L class buffers 5 and 24 have issued a cell output request (S11), the cell to be read is selected using an L class contention algorithm (S12), and the selected cell is read (S13). However, if a BP-L signal has been received, no L class cell will be read.

The H class contention control algorithm compares the residence times of the two cells and outputs the cell with the longer residence time. Alternatively, by assigning cell read probabilities in advance to the two buffers in question, a cell can be selected and read at any time in accordance with these probabilities.

The L class contention control algorithm selects and reads a cell whenever required in accordance with preassigned cell read probabilities to the two buffers in question. Alternatively, in the same manner as the H class contention control algorithm, it can compare the residence times of the two cells and output the cell with the longer residence time. However, in this case, the length of time an L class cell has been resident in the buffer has to be written in part of the cell header by timer 20 or 21, based on when the cell was input to L class buffer 5 or 24.

Thus, by storing H class and L class cells in separate buffers in contention control units 3-1 to 3-4 and in buffer units 2-1 to 2-4, and reading the cells selectively, the quality of an H class service will not deteriorate due to L class traffic. In addition, because contention control units 3-1 to 3-4 are arranged in distributed manner and perform autonomous and distributed contention control, extendibility is improved.

A further explanation will now be given of contention control on the basis of cell read probability when cell priorities are equal. Consider the k-th buffer unit 2-k and the k-th contention control unit 3-k counting from the upstream end (where k is any of 1, 2, N). Probabilities are preset so that when cells are in contention at this k-th buffer unit 2-k and contention control unit 3-k, the cell to be read from buffer pair 30 and the cell to be read from buffer pair 31 shown in FIG. 13 are selected with probabilities of $1/k$ and $(k-1)/k$ respectively.

For example, in the third buffer unit 2-3 and the third contention control unit 3-3, the cell to be read from buffer pair 30 and the cell to be read from buffer pair 31 are selected with probabilities of $1/3$ and $2/3$ respectively. If cell read probabilities are preset in this way, the probability of a cell which has been input to buffer pair 30 of the k-th buffer unit 2-k being selected by the cell contention algorithm right up to being output to the output line, is given by the product of the probability of that cell being selected in the k-th contention control unit 3-k, and the probabilities of the cells which are input to buffer pairs 31 of contention control units 3-(k+1) to 3-N being selected by the cell contention algorithm. This can be expressed as:

$$(1/k) \times (k/(k+1)) \times \times (N-2)/(N-1)) \times (N-1)/N = 1/N$$

Here, the first term on the left-hand side of this equation is the probability of a cell which has been read from buffer pair 30 of k-th buffer unit 2-k being selected in k-th contention control unit 3-k. The second term is the probability of a cell which has been read from buffer pair 31 of (k+1)th contention control unit 3-(k+1) being selected. The final term is the probability of a cell which has been read from buffer pair 31 of N-th contention control unit 3-N being selected. The right-hand side of the equation corresponds to the probability, $1/N$, of a cell which has been read from buffer pair 30 of the N-th buffer unit 2-N being selected in N-th contention control unit 3-N. Therefore, when cell priority is equal, appropriate selection probability is maintained by performing contention control based on such cell read probabilities.

Figure 16:
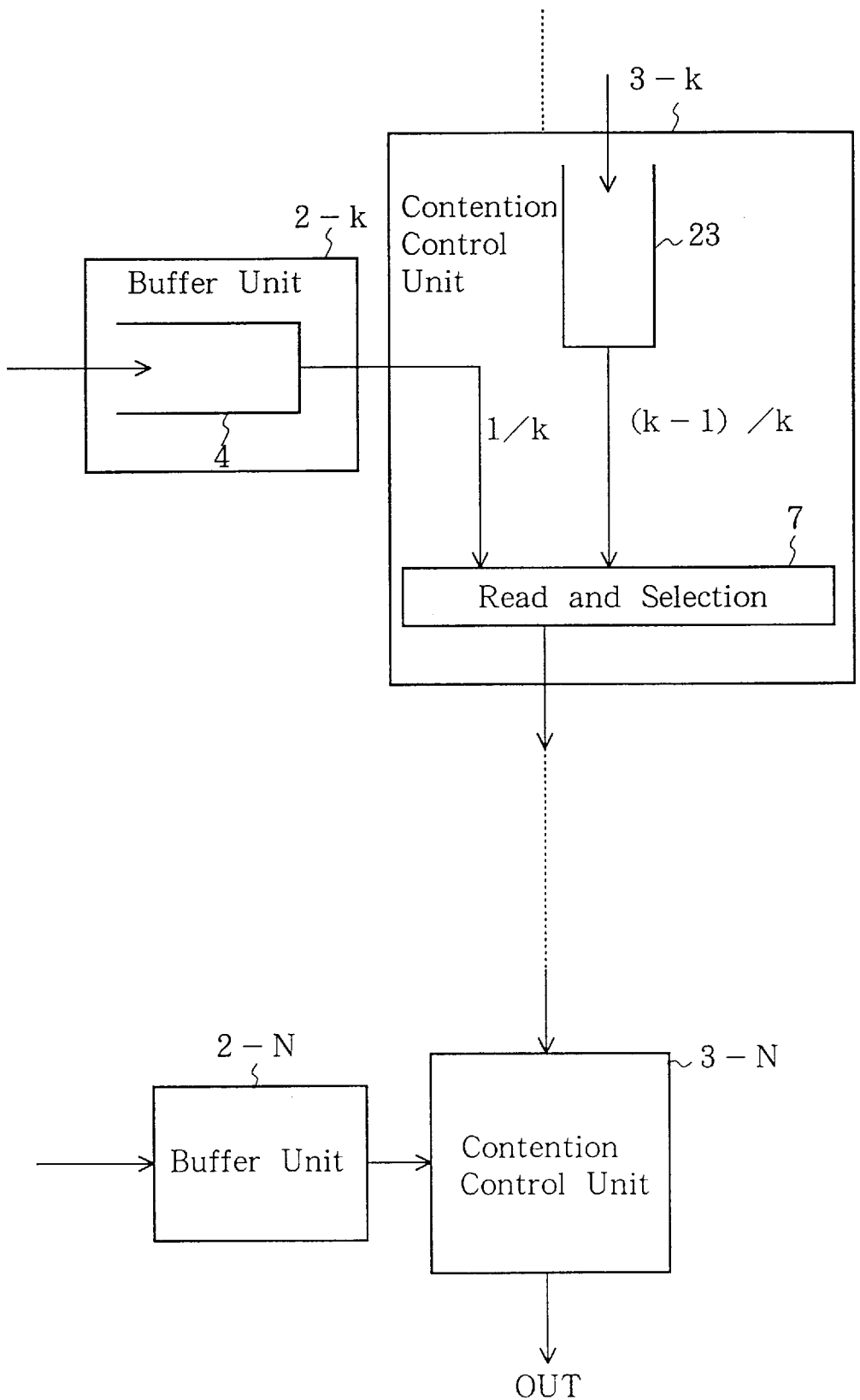
FIG. 16 shows an example in which the L class buffers and the selectors have been removed from a buffer unit and a contention control unit according to the fifth embodiment.

FIG. 16 shows a variation of this fifth embodiment of the invention, in which L class buffers 5 and 24 and selectors 33, 6, 8 and 9, have been removed from the buffer unit and contention control unit configuration according to the fifth embodiment of the invention that was illustrated in FIG. 13. If contention control is performed using the read probabilities explained above, and it is assumed that there will be no L class cells, the configuration of the buffer unit and contention control unit of the fifth embodiment illustrated in FIG. 13 can be changed to the simplified equivalent configuration shown in FIG. 16. The same simplification can be made if it is assumed that no H class cells will be present.

Figure 17:
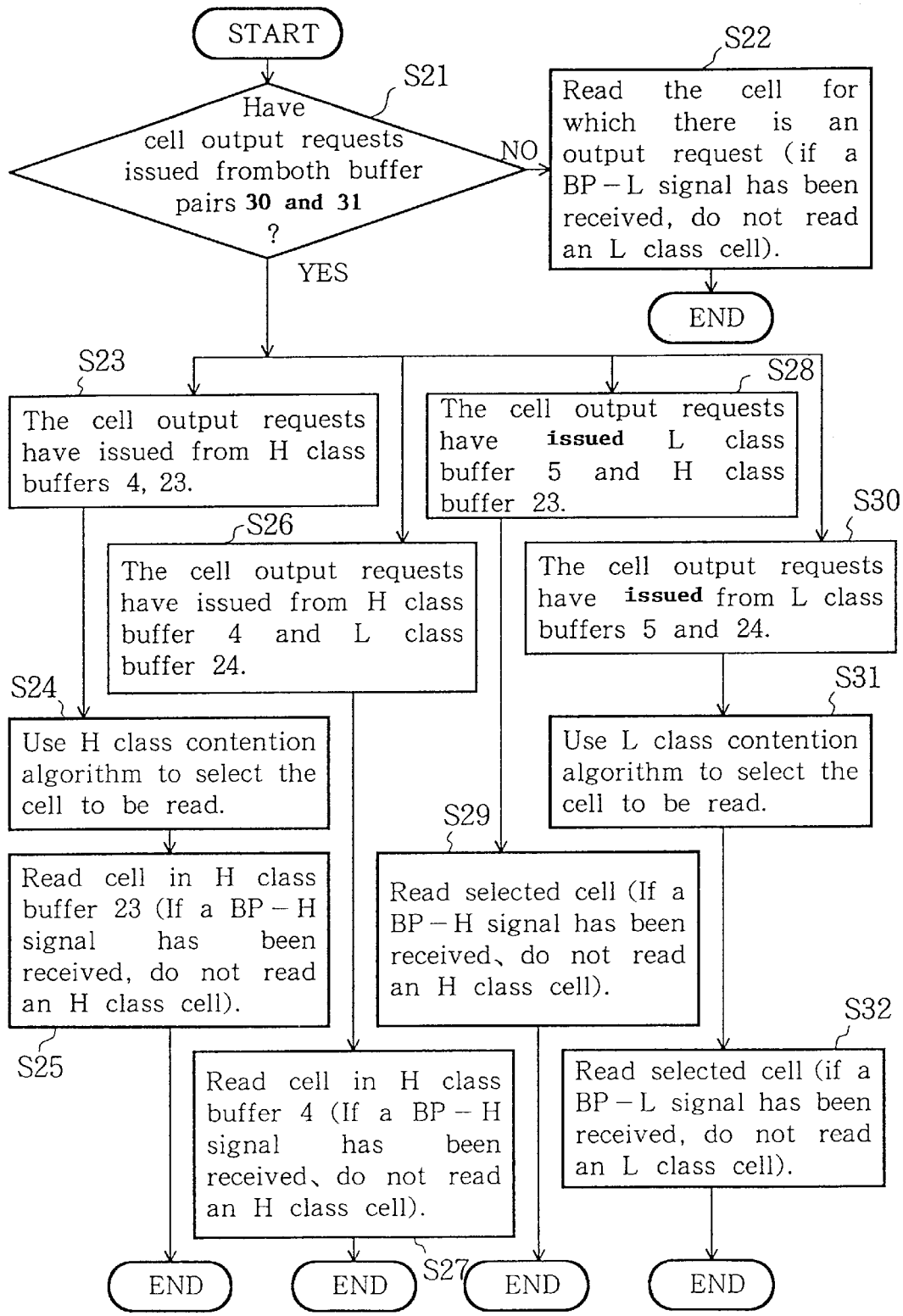
FIG. 17 is a flowchart showing the operation of the read and selection circuit in a sixth embodiment of the present invention.

The operation of read and selection circuit 7 in a sixth embodiment of the invention is shown in FIG. 17, which is a flowchart showing the operation of the contention control circuit. In the fifth embodiment of the invention, the operation of read and selection circuit 7 was stopped if contention control unit 3 received a BP-H signal from the immediately downstream contention control unit, even if an L class cell was present (see FIG. 15). In the sixth embodiment of the invention, even if a BP-H signal is received, if L class buffers 5 and 24 have issued a cell output request, an L class cell is selected and read, provided that no BP-L signal is received. Of course, when a BP-H signal is received, no H class cell is read. When a BP-L signal is received, no L class cell is read.

That is, regardless of whether a BP-H signal has been received from the lower contention control unit, it is decided whether a cell output request has issued from both buffer pair 30 of buffer unit 2 and buffer pair 31 of contention control unit 3 (S21). If a cell output request has issued from only one of these buffer pairs, the cell for which there is an output request is read (S22). However, if a BP-L signal has been received, no L class cell will be read.

When a cell output request has been issued from both buffer pair 30 and buffer pair 31 (S21), the following four operations can occur:
1. If H class buffers 4 and 23 have issued a cell output request (S23), the cell to be read is selected using an H class contention algorithm (S24), and the selected cell is read (S25). However, that if a BP-H signal has been received, no H class cell will be read.
2. If H class buffer 4 and L class buffer 24 have issued a cell output request (S26), the cell in H class buffer 4 is read (S27), except when a BP-H signal has been received, in which event no H class cell will be read.
3. If L class buffer 5 and H class buffer 23 have issued a cell output request (S28), the cell in H class buffer 23 is read (S29), except when a BP-H signal has been received, in which event no H class cell will be read.
4. If L class buffers 5 and 24 have issued a cell output request (S30), the cell to be read is selected using an L class contention algorithm (S31), and the selected cell is read (S32). However, if a BP-L signal has been received, no L class cell will be read.

Figure 18:
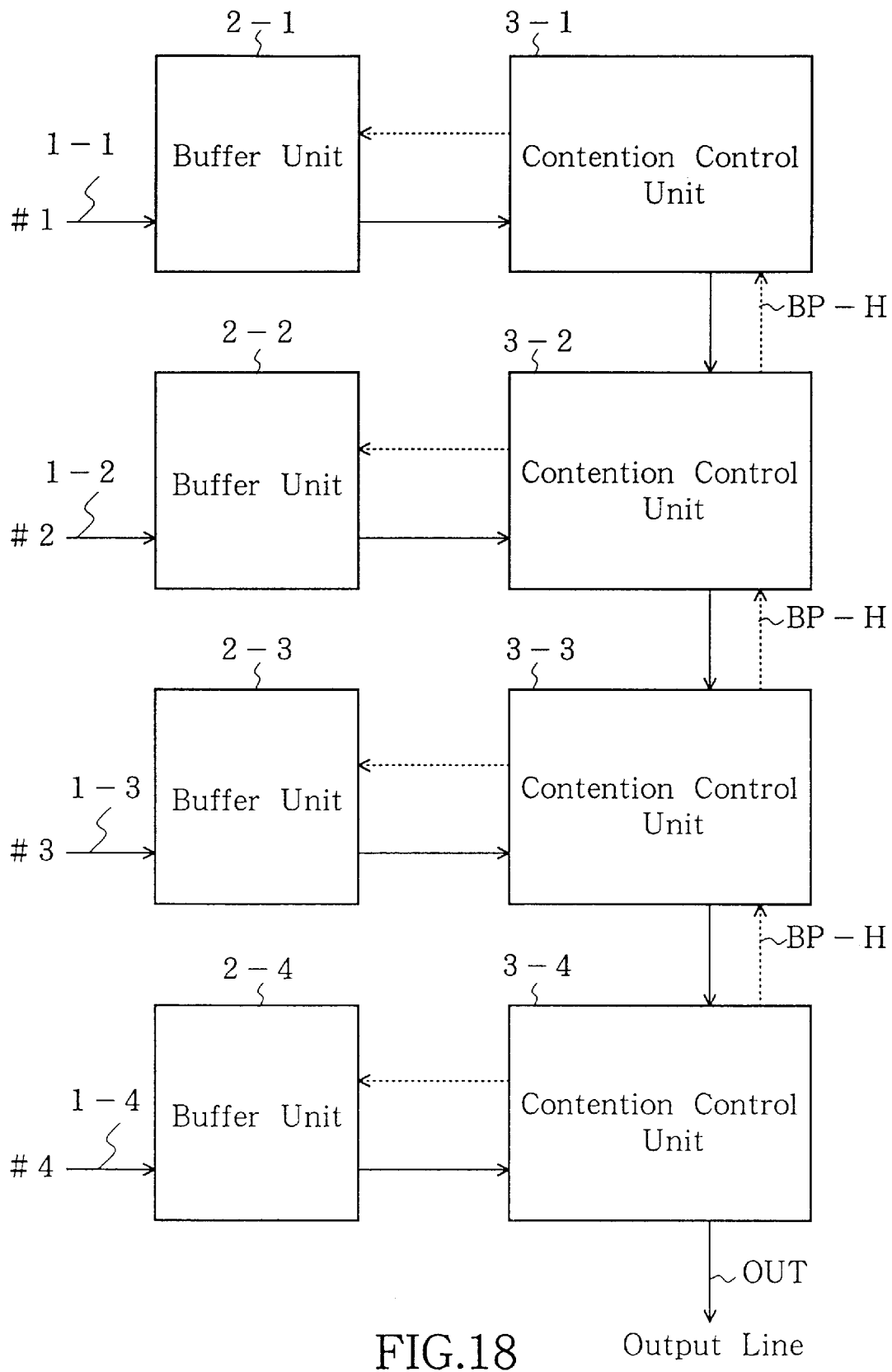
FIG. 18 shows the overall configuration of a seventh embodiment of the present invention.
Figure 19:
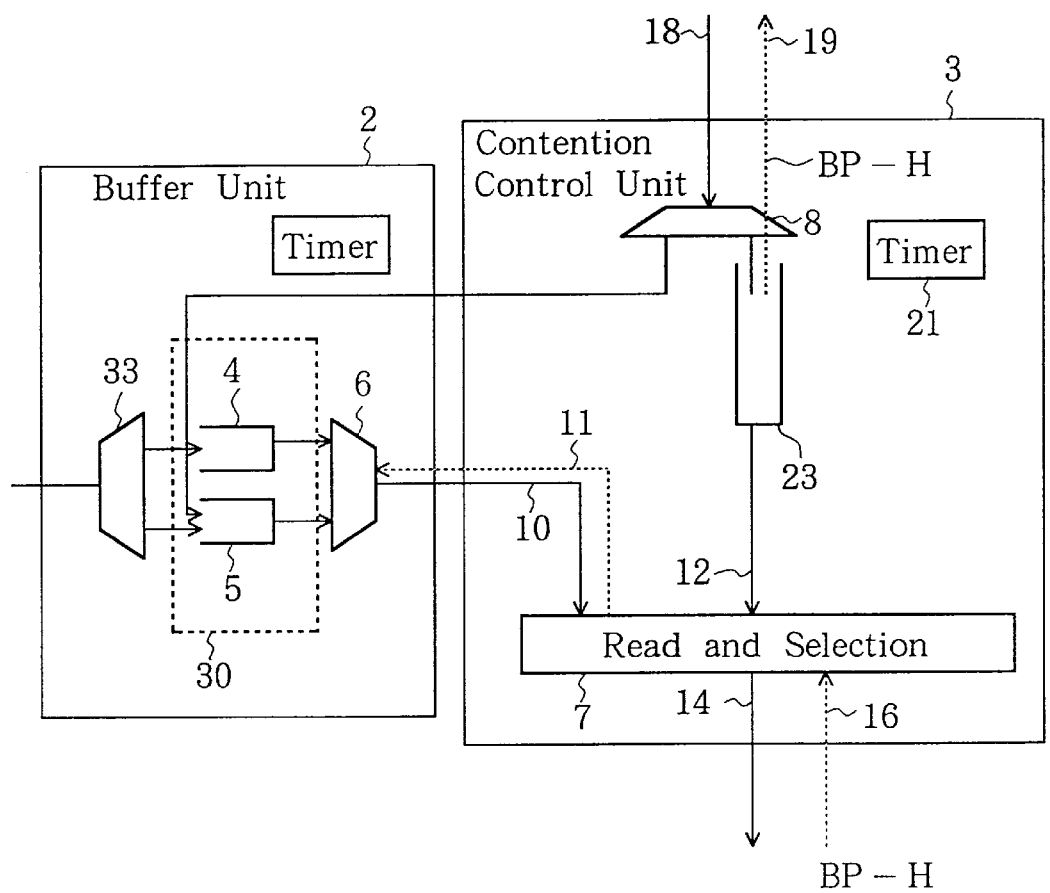
FIG. 19 is a block diagram of a buffer unit and a contention control unit according to the seventh embodiment.
Figure 20:
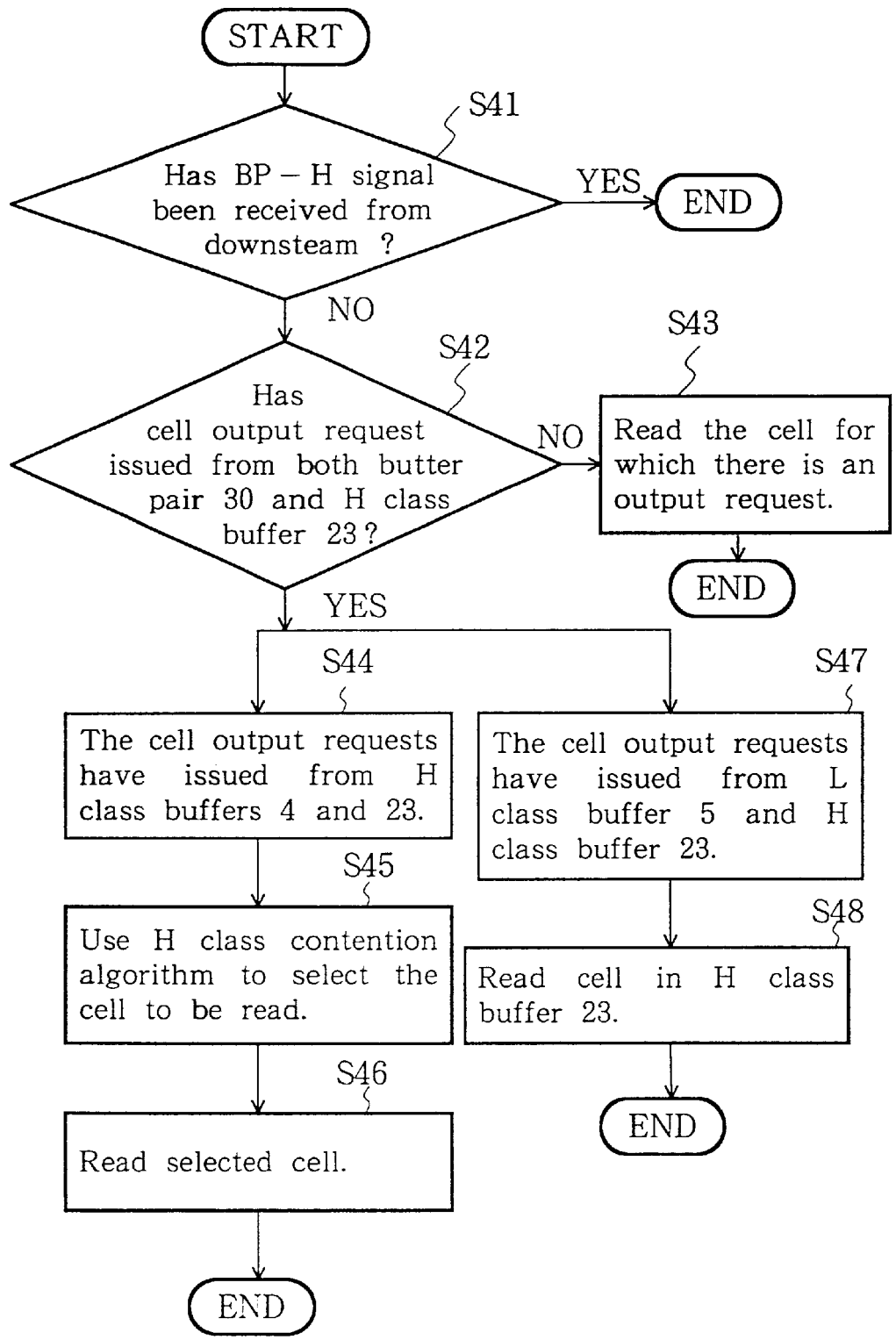
FIG. 20 is a flowchart of the operation of a read and selection circuit according to the seventh embodiment.
Figure 21:
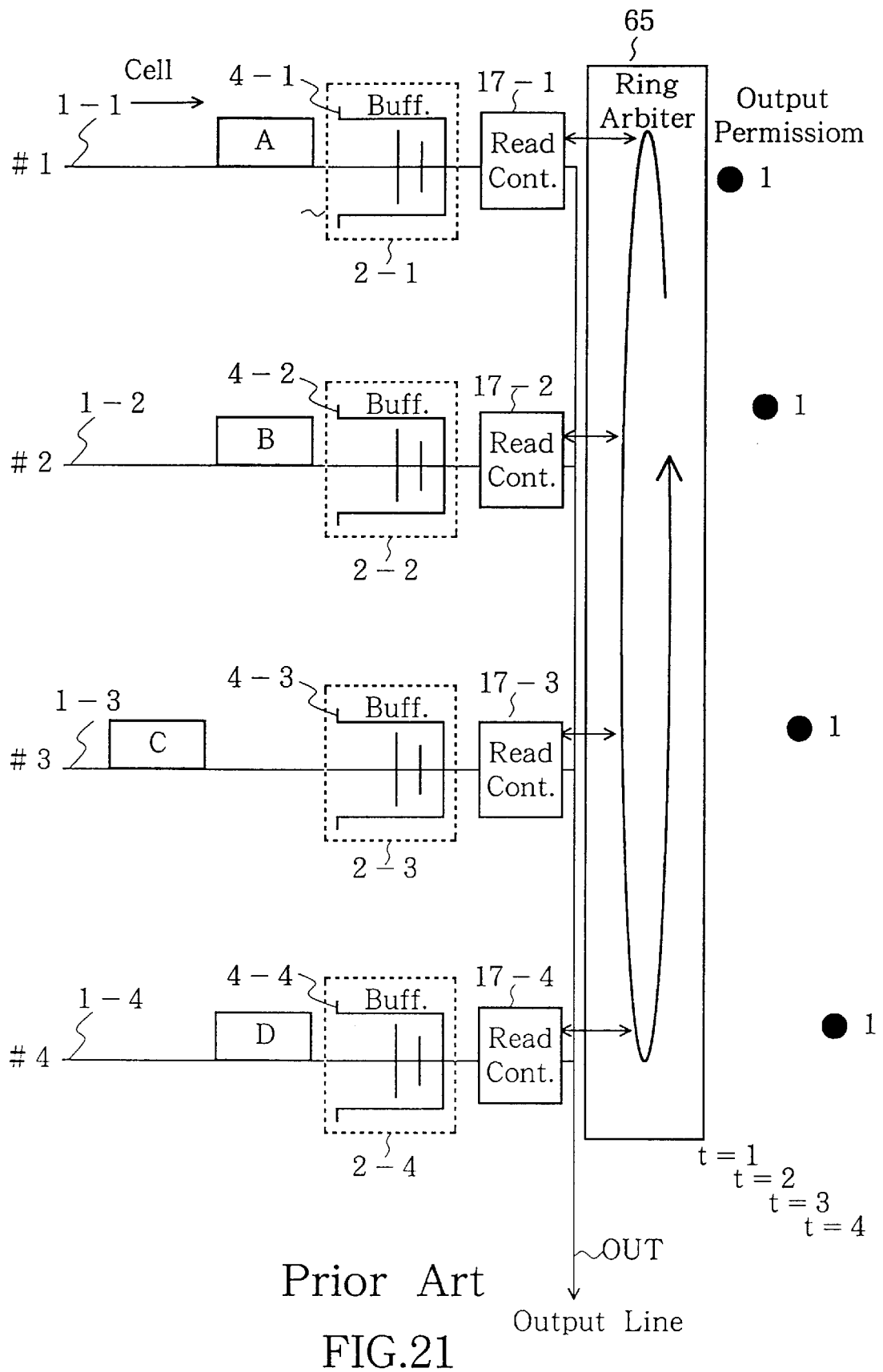
FIG. 21 shows the overall configuration of a prior art contention control circuit.
Figure 22:
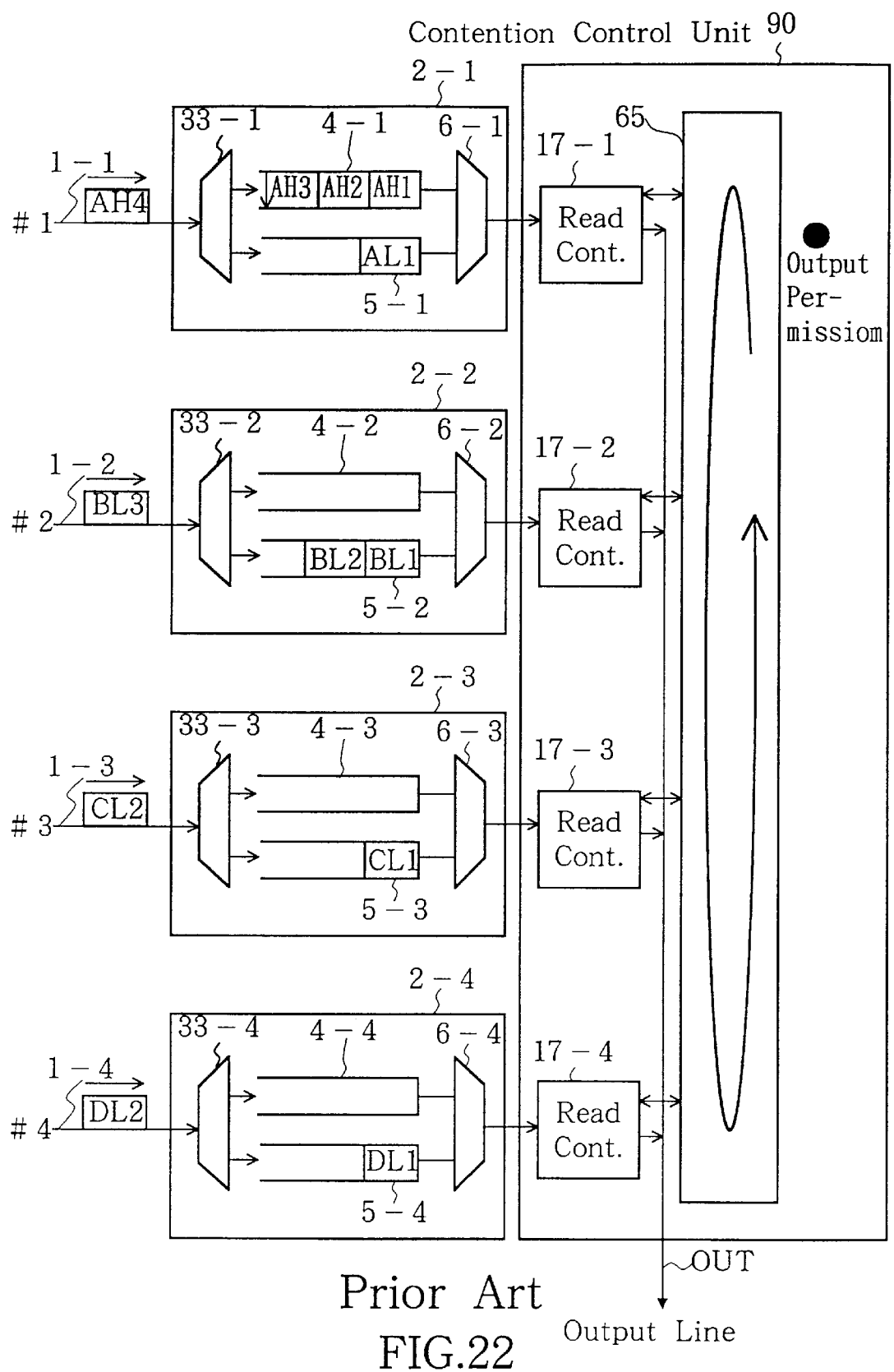
FIG. 22 shows the overall configuration of a prior art contention control circuit in an ATM network which includes cells of different service classes.
Figure 23:
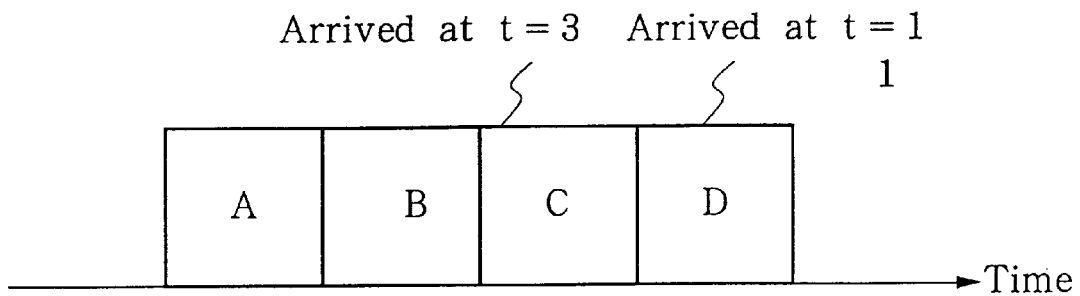
FIG. 23 is a timing chart showing an output of a conventional contention control circuit.
Figure 24:
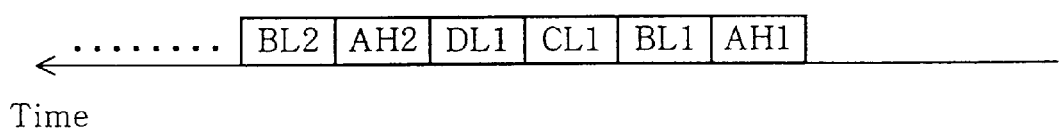
FIG. 24 is a timing chart showing the output of a conventional contention control circuit.

A seventh embodiment of the invention will be explained with reference to FIGS. 18–20. FIG. 18 shows the overall configuration of this seventh embodiment, while FIG. 19 is a block diagram of a buffer unit 2 and a contention control unit 3 according to the seventh embodiment. Whereas in the fifth and sixth embodiments of this invention H class buffer 23 and L class buffer 24 were provided in contention control unit 3 as shown in FIG. 13, there is no buffer equivalent to L class buffer 24 of the fifth embodiment (see FIG. 19) in the seventh embodiment of the invention. Instead, when an L class cell has been transferred from the immediately upstream contention control unit via line 18, it is selected by selector 8 and transferred to L class buffer 5 of buffer unit 2.

The cell read operation of buffer unit 2 is the same as in the fifth embodiment. When H class buffer 23 of contention control unit 3 is full, it sends a BP-H signal to the immediately upstream contention control unit, as in the fifth embodiment. In this seventh embodiment of the invention, because contention control unit 3 does not have an L class buffer, no BP-L signal is required (see FIG. 18).

Next, the operation of read and selection circuit 7 will be explained with reference to the flowchart of FIG. 20. Cells are read at a given interval, and therefore, the circuit operation shown in FIG. 20 takes place in this given interval, with the same operation being repeated in the next read interval. First, the processing terminates if a BP-H signal is received from the immediately downstream contention control unit (S41). If a BP-H signal is not received from the downstream contention control unit, it is decided whether a cell output request has been issued from both buffer pair 30 of buffer unit 2 and H class buffer 23 (S42). If there is a cell output request from only one of these buffer pairs, the cell for which there is an output request is read (S43).

If a cell output request has been issued from both buffer pair 30 and H class buffer 23 (S42), the following two operation can occur:
1. If H class buffers 4 and 23 have issued a cell output request (S44), the cell to be read is selected using an H class contention algorithm (S45), and the selected cell is read (S46).
2. If L class buffer 5 and H class buffer 23 have issued a cell output request (S47), the cell in H class buffer 23 is read (S48).

The H class contention control algorithm compares the residence times of the two cells and outputs the cell with the longer residence time. Alternatively, by assigning cell read probabilities in advance to the two buffers in question, a cell can be selected and read at any time in accordance with these probabilities.

Thus, by transferring an L class cell that has been transferred from the immediately upstream contention control unit to L class buffer 5 of buffer unit 2, instead of to L class buffer 24 of contention control unit 3 as shown in the fifth and sixth embodiments, overall buffer size in the contention control unit can be reduced, and the algorithm for operating read and selection circuit 7 can be simplified. In addition, as in the fifth and sixth embodiments of the invention, the quality of the H class service does not deteriorate due to L class traffic. In addition, because contention control units 3-1 to 3-4 are arranged in distributed manner and perform autonomous and distributed contention control, extendibility is improved.

Thus, by storing H class cells and L class cells in separate buffers in the contention control units and reading these selectively, the quality of an H class service does not deteriorate due to L class traffic. In addition, because the contention control units are arranged in distributed manner and perform autonomous and distributed contention control, extendibility is improved. Furthermore, by transferring L class cells that have been transferred from an immediately upstream contention control unit to the L class buffer of the buffer unit, instead of to an L class buffer of the contention control unit, overall buffer size in the contention control unit can be reduced. Furthermore, the algorithm for operating the cell read and selection circuit can be simplified.

As has now been explained, the present invention can guarantee that temporal order is maintained when cell contention control is performed. It can also improve extendibility because it is capable of autonomous and distributed contention control. Furthermore, it can perform contention control for each different quality class. As a result, the service quality provided for H class cells does not deteriorate due to L class cell traffic.

What is claimed is:
1. A contention control circuit comprising:
  a plurality of buffer units for temporarily storing cells respectively arriving from a plurality of input lines; and
  a plurality of contention control means which respectively output cells that have been respectively read from said buffer units to a single output line without collisions between said cells;
  wherein each buffer unit has a first buffer;
  each contention control means comprises:
    means for entering for a cell which has been input to the corresponding first buffer, information indicative of the priority with which that cell is to be output;
    a contention control unit provided in correspondence with each first buffer, said contention control units being cascade connected to the output line; and
  each contention control unit comprises:
    a second buffer for temporarily storing cells which have been output from the immediately upstream contention control unit for eventual output to the output line;
    means for comparing the information indicative of priority that has been entered respectively in the head cell of the cells stored in the first buffer and in the head cell of the cells stored in the second buffer; and
    selection means for selecting the cell with the higher priority in accordance with the comparison result of the comparing means and outputting the selected cell to the immediately downstream contention control unit or to the output line.

2. A contention control circuit according to claim 1, wherein the information indicative of priority is information relating to the time at which a cell was input to each first buffer of said buffer units.

3. A contention control circuit according to claim 1, wherein the information indicative of priority is information relating to how long the cell has queued since it was input to each first buffer of said buffer units.

4. A contention control circuit according to claim 1, wherein the means for entering information in a cell is provided separately for each first buffer of said buffer units.

5. A contention control circuit according to claim 1, wherein the means for entering information in a cell is provided in common for a plurality of first buffers.

6. A contention control circuit according to claim 1, wherein each contention control unit further comprises:
   means for counting the number of cells consecutively output from the first buffer and from the second buffer;
   wherein the counts obtained by the counting means are respectively subtracted from the queuing time information that has been entered in the head cell of the first buffer and of the second buffer, the results of these subtractions form new queuing time information, and said new queuing time information is used as the information indicative of priority.

7. A contention control circuit according to claim 1, wherein the selection means comprises means for reading a cell from the first buffer or the second buffer in accordance with respective predefined read probabilities when the comparison result of the comparing means indicates that the two cells have the same priority.

8. A contention control circuit according to claim 7, wherein for the k-th selection means counting from upstream end of the contention control units (where k is a natural number), the read probability is 1/k for the first buffer and (k−1)/k for the second buffer.

9. A contention control circuit comprising:
   a plurality of buffer units for temporarily storing cells respectively arriving from a plurality of input lines; and
   a plurality of contention control means which respectively output cells respectively read from said buffer units to a single output line without collisions between the cells;
   wherein each buffer unit comprises:
      a first high priority buffer in which high quality of service class cells are stored;
      a first low priority buffer in which low quality of service class cells are stored; and
      a first selection means which preferentially outputs cells stored in the first high priority buffer;
   wherein each contention control means comprises a contention control unit provided in correspondence with a corresponding buffer unit, said contention control units being cascade connected to the output line; and
   wherein each contention control unit comprises, for cells which have been output from the immediately upstream contention control unit for eventual output to the output line;
      a second high priority buffer in which are stored high quality of service class cells;
      a second low priority buffer in which are stored low quality of service class cells;
      a second selection means for preferentially outputting cells stored in the second high priority buffer; and
      read and selection means which, when one of the first selection means and the second selection means outputs a high service class cell, reads that high service class cell, and when the first selection means and the second selection means are both about to output cells of equal service class, reads a cell after performing contention control, and outputs it to the output line.

10. A contention control circuit according to claim 9, further comprising:
    means for entering information relating to how long the cell queues from input until output in cells which have been input to a first and a second high priority buffer; and
    wherein the read and selection means reads the cell which has the larger value for the queuing time information.

11. A contention control circuit according to claim 9, wherein the first low priority buffer and the second low priority buffer have been configured as a single buffer.

12. A contention control circuit according to claim 9, wherein the read and selection means comprises means for reading cells from the first and second selection means in accordance with respective predefined read probabilities.

13. A contention control circuit according to claim 12, wherein for the k-th read and selection means counting from upstream end of the contention control units (where k is a natural number), the read probability is 1/k for the first selection means and (k−1)/k for the second selection means.

14. A contention control circuit comprising:
    a plurality of buffer units for temporarily storing cells respectively arriving from a plurality of input lines; and
    a plurality of contention control means which respectively output cells that have been respectively read from said buffer units to a single output line without collisions between the cells;
    wherein each contention control means comprises a contention control unit provided in correspondence with each buffer unit, said contention control units being cascade connected to the output line; and
    each contention control unit comprises:
       a buffer for temporarily storing cells which have been output from the immediately upstream contention control unit for eventual output to the output line, and
       read and selection means for reading cells from the buffer unit and said buffer in accordance with respective predefined read probabilities, and for outputting these cells to the output line.

15. A contention control circuit according to claim 14, wherein for the k-th read and selection means counting from upstream end of the cascade connected contention control units (where k is a natural number), the read probability is 1/k for the buffer unit and (k−1)/k for the buffer of the contention control unit.

* * * * *